US005911401A

United States Patent [19]

Hrytzak et al.

[11] Patent Number: 5,911,401

[45] Date of Patent: Jun. 15, 1999

[54] ELECTRIC ACTUATED EXHAUST GAS RECIRCULATION VALVE

[75] Inventors: Bernard J. Hrytzak, Chatham, Canada; Takeshi Gomi, Saitama, Japan; Hirotomi Nemoto, Saitama, Japan; Yoshio Yamamoto, Saitama, Japan

[73] Assignee: Siemens Electric Limited, Mississauga, Canada

[21] Appl. No.: 08/804,587

[22] Filed: Feb. 24, 1997

Related U.S. Application Data

[63] Continuation of application No. 08/520,539, Aug. 29, 1995, abandoned, and application No. 08/520,541, Aug. 29, 1995, abandoned.

[51] Int. Cl.[6] ............................ F02M 25/07; F16K 31/06

[52] U.S. Cl. ....................................... 251/129.15; 335/262

[58] Field of Search ......................... 251/129.15, 129.01; 123/571; 335/247, 249, 251, 255, 257, 271, 262

[56] References Cited

U.S. PATENT DOCUMENTS

| | | | |
|---|---|---|---|
| 4,961,413 | 10/1990 | Grey et al. . | |
| 5,094,218 | 3/1992 | Everingham et al. . | |
| 5,129,623 | 7/1992 | Lockwood . | |
| 5,203,312 | 4/1993 | Sato . | |
| 5,435,519 | 7/1995 | Everingham | 251/129.15 |
| 5,460,146 | 10/1995 | Frankenberg | 123/571 |
| 5,467,962 | 11/1995 | Bircann et al. | 251/129.15 |
| 5,593,132 | 1/1997 | Hrytzak | 251/129.15 |
| 5,626,165 | 5/1997 | Shinobu | 251/129.15 X |
| 5,626,327 | 5/1997 | Clark | 251/129.15 |
| 5,687,698 | 11/1997 | Mastro et al. | 335/225 X |

FOREIGN PATENT DOCUMENTS

| | | |
|---|---|---|
| A2147745 | 3/1973 | France . |
| A3644744 | 7/1988 | Germany . |
| U-8805727 | 8/1989 | Germany . |
| U-4332513 | 3/1995 | Germany . |
| A06249083 | 9/1994 | Japan . |
| A2250801 | 6/1992 | United Kingdom . |
| WOA95 19497 | 7/1995 | WIPO . |
| WO 97/08448 | 3/1997 | WIPO . |

*Primary Examiner*—Kevin Lee

[57] ABSTRACT

Improved accuracy and response of an EEGR valve (60) are obtained by novel constructional features of an upper stator member (194), a lower stator member (174), a bearing guide member (140), and a shell (64), and various inter-relationships between them for improved concentricity of parts, stable and accurate positioning of parts relative to each other, and better resistance to muddy water intrusion at an ambient air space (76) that provides for ambient air to pass through for cooling the valve. A lower stator member (174) has a through-hole (184) to which a bearing member (140) that guides a pintle shaft (114) is concentrically disposed. A frusto-conical surface (182) extends from through-hole (184) to the ambient air space (76).

25 Claims, 17 Drawing Sheets

ELECTRIC ACTUATED EXHAUST GAS RECIRCULATION VALVE

REFERENCE TO RELATED APPLICATIONS

This application is a continuation of application Ser. No. 08/520,539 filed Aug. 29, 1995, abandoned and application Ser. No. 08/520,541 filed Aug. 29, 1995, abandoned and the contents of those applications are incorporated by reference as if fully disclosed herein.

FIELD OF THE INVENTION

This invention relates to exhaust gas recirculation (EGR) valves for internal combustion engines, and is particularly directed to a new and improved construction for improving the accuracy and response of the valve to electric control signals, for improving ambient cooling of the valve, and for improving the ability of the valve to withstand intrusion of foreign substances, especially muddy water, into the interior mechanism of the valve via an ambient air cooling space.

BACKGROUND AND SUMMARY OF THE INVENTION

Controlled engine exhaust gas recirculation is a commonly used technique for reducing oxides of nitrogen in products of combustion that are exhausted from an internal combustion engine to atmosphere. A typical EGR system comprises an EGR valve that is controlled in accordance with engine operating conditions to regulate the amount of engine exhaust gas that is recirculated to the induction fuel-air flow entering the engine for combustion so as to limit the combustion temperature and hence reduce the formation of oxides of nitrogen.

Since they are typically engine-mounted, EGR valves are subject to a harsh operating environment that includes wide temperature extremes and vibrations. Exhaust emission requirements impose more stringent demands for improved control of such valves. Use of an electric actuator is one means for obtaining improved control, but in order to be commercially successful, such an actuator must be able to operate properly in such extreme environments for an extended period of usage. Moreover, in mass-production automotive vehicle applications, component cost-effectiveness is also essential. An EGR valve electric actuator that possesses more accurate and quicker response results in improved driveability and fuel economy for a vehicle having an internal combustion engine that is equipped with an EGR system. It also provides better control over tailpipe emissions.

The present invention relates to new and unique construction for certain component parts of such a valve that enables accuracy and response to be improved, and also better ambient cooling to be achieved while, providing a means to resist intrusion of foreign matter, such as muddy water for example, into the internal valve mechanism via the improved ambient cooling means.

Certain aspects of the invention relate to improvements in certain parts of the valve that provide for a more accurate definition of the magnetic circuit air gap that is provided by upper and lower stator members. Better concentricity and locating of these two stator members, and other related parts such as a bearing guide member that guides the valve shaft, improve accuracy and response. The manner of uniting certain parts also improves the ruggedness of the valve by ensuring that relative movement of the parts that might change important relationships affecting performance does not occur in use.

The invention also relates to improvements in the area of the valve that contains the lower stator member and the bearing member. Generally speaking, the organization and arrangement of these two members, and some related, parts improves part-to-part concentricity and is useful in resisting intrusion of muddy water into the interior operating mechanism.

The problem of muddy water intrusion arises because of the desirability of providing air ambient circulation through a portion of the valve. The pintle head and associated valve seat are in the hot exhaust path through the valve and are exposed to very high temperatures. The electric actuator is operatively connected to the pintle, but is slightly farther away from the engine. It is desirable to provide for air circulation through the valve housing between the actuator and the parts that are closer to the engine. However since it is engine-mounted, the valve will be subject to the outside environment, and one of the hazards is muddy water intrusion due to road splash, etc.

Various features, advantages, and benefits of the invention for achieving the desired objectives will be seen in the ensuing description and claims that are accompanied by drawings. The drawings disclose a presently preferred embodiment of the invention according to the best mode contemplated at this time for carrying out the invention.

DESCRIPTION OF THE PREFERRED EMBODIMENT

Figure 1:
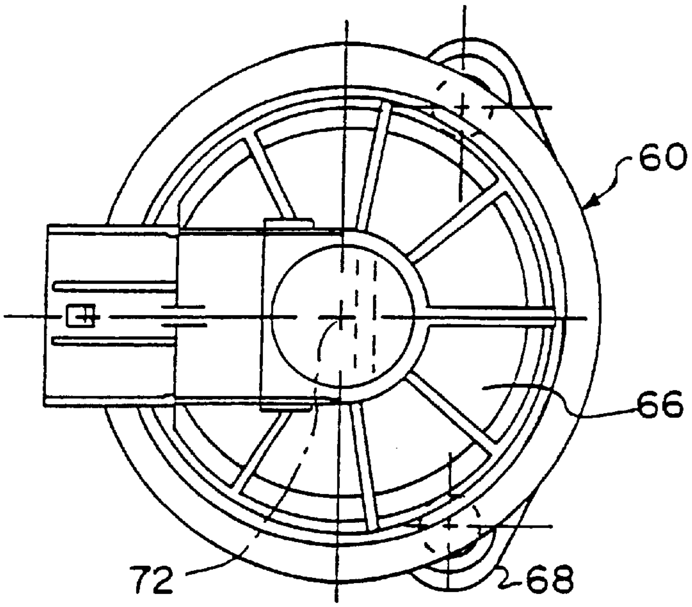
FIGS. 1, 2, 3, and 4 are respective top plan, front elevation, left side elevation, and bottom views of an electric EGR valve (EEGR valve) embodying principles of the invention.
Figure 2:
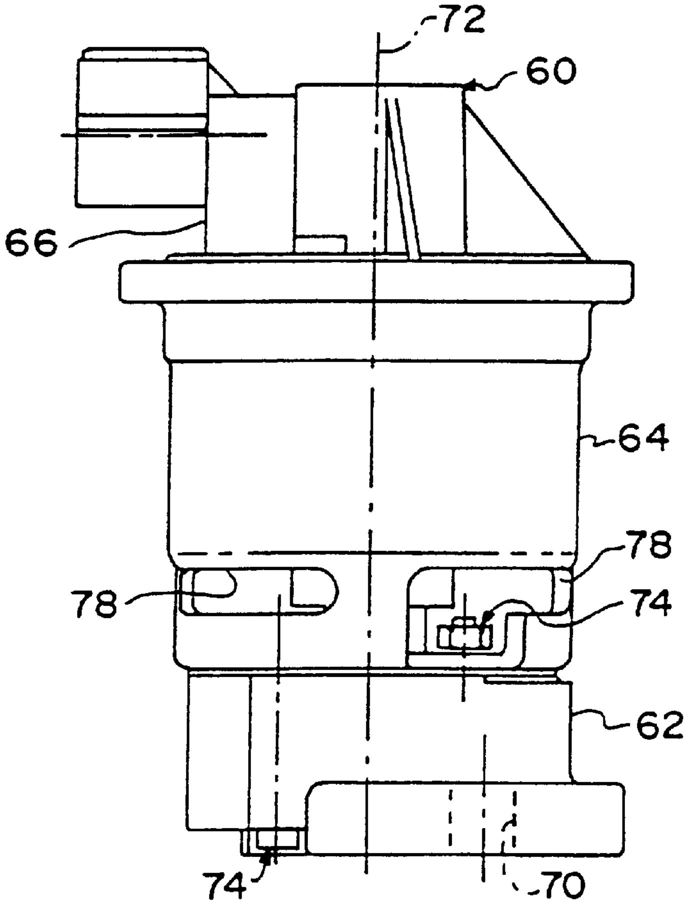
Figure 3:
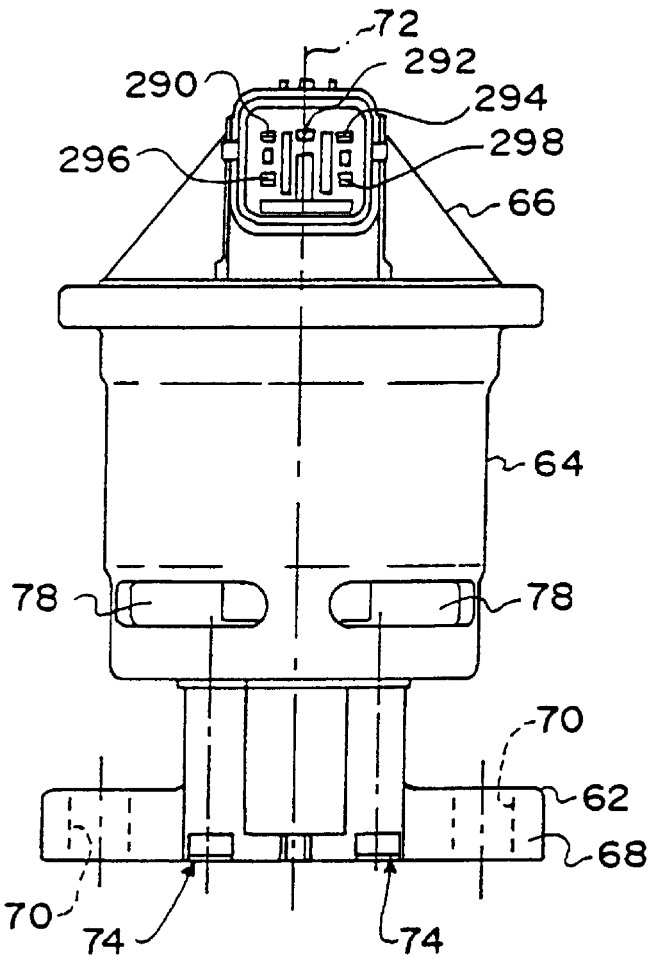
Figure 4:
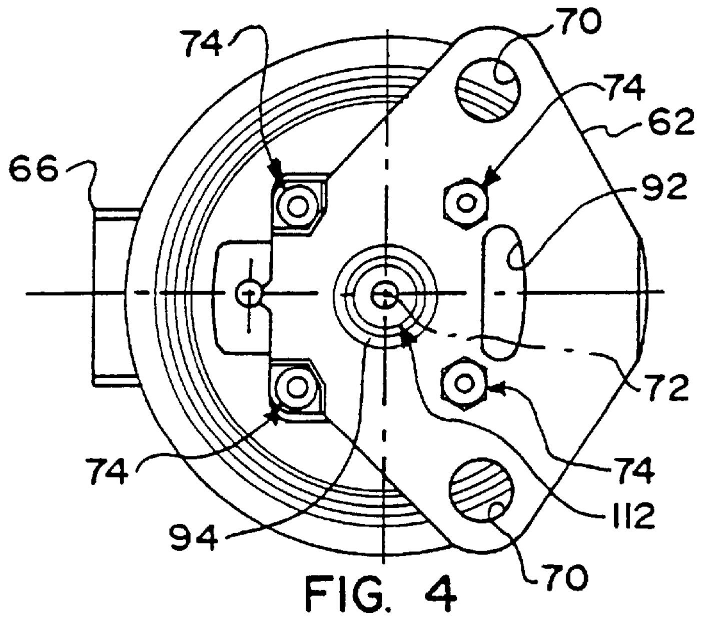

FIGS. 1–4 illustrate the exterior appearance of an electric EGR valve (EEGR valve) 60 embodying principles of the present invention. EEGR valve 60 comprises valve body structure composed of a metal base 62, a generally cylindrical metal shell 64 disposed on top of base 62, and a non-metallic cap 66 forming a closure for the otherwise open top of shell 64.

Base 62 comprises a flange 68 having a flat bottom surface adapted to be disposed against a surface of an exhaust manifold of an internal combustion engine, typically sandwiching a suitably shaped gasket (not shown) between itself and the manifold. Flange 68 comprises two through-holes 70 that provide for the separable attachment of EEGR valve 60 to an exhaust manifold. For example, the manifold may contain a pair of threaded studs which pass through through-holes 70 and onto the free ends of which lock washers are first placed, followed by nuts that are threaded onto the studs and tightened to force flange 68 toward the manifold, thereby creating a leakproof joint between valve 60 and the manifold.

Reference numeral 72 designates a main longitudinal axis of EEGR valve 60. Base 62 further comprises four through-holes that are parallel to axis 72 and are centered on a common imaginary circle at 90 degree intervals about axis 72. Four fasteners 74 fasten base 62 and shell 64 tightly together via the four through-holes in base 62 and four holes in a bottom wall 64*c* (FIG. 5) of shell 64 that register with the four through-holes in base 62. Each fastener comprises a bolt, a lock washer, and a nut. The head of each bolt is received in a suitable recess in flange 68 while a corresponding lock washer is disposed onto the free end of the respective bolt shank that extends through the respective hole in shell 64, and the corresponding nut is threaded onto the threaded end of the bolt shank and tightened. A suitable shaped gasket 75 is sandwiched between the base and shell.

Figure 5:
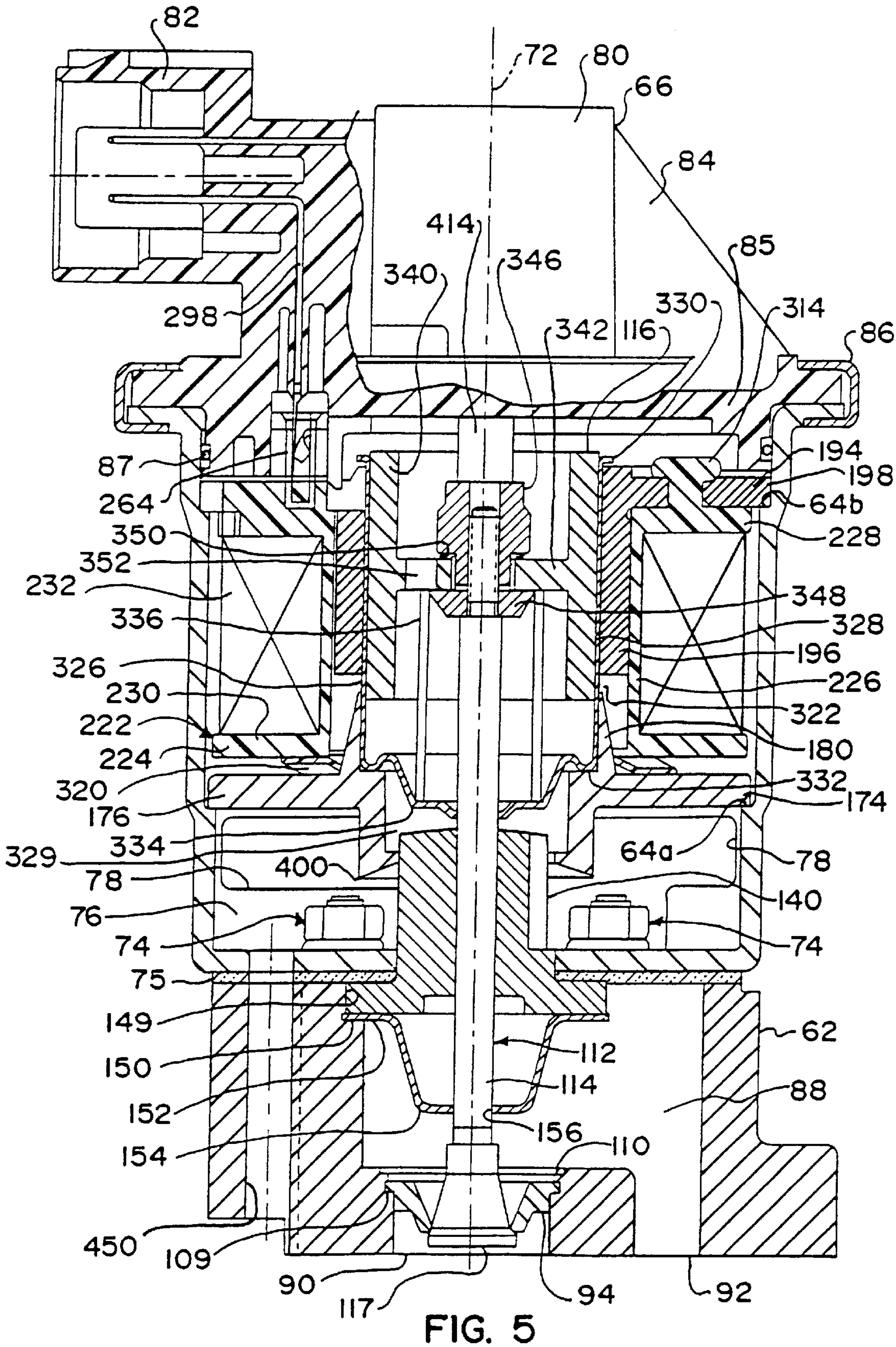
FIG. 5 is an enlarged view, partly in cross section, of the EEGR valve of FIGS. 1–4.

With additional reference to FIG. 5, an annular air space 76 is provided within shell 64 immediately above the shell's bottom wall. This air space is open to the exterior by means of several through-slots 78 formed in the shell side wall immediately above the shell's bottom wall. This arrangement provides for air circulation through EEGR valve 60 between base 62 and internal parts within shell 64 above the shell's bottom wall 64*c*. Such air circulation provides beneficial cooling that serves to reduce the amount of engine heat that might otherwise be transferred to those internal parts.

Cap 66 is a non-metallic part, preferably fabricated from suitable polymeric material. In addition to providing a closure for the otherwise open upper end of shell 64, cap 66 comprises a central cylindrical tower 80 and an electrical connector shell 82 that projects radially outwardly from tower 80. Tower 80 has a hollow interior shaped to house a position sensor that is utilized for sensing the extent to which EEGR valve 60 is open. Cap 66 further contains several electrical terminals that provide for such a sensor and an electric actuator to be operatively connected with an engine electrical control system, as will hereinafter be described in greater detail. Ends of these terminals are contained within shell 82 to form an electrical connector plug that is adapted to mate with a mating plug (not shown) of an electrical wiring harness of the engine electrical system. Cap 66 also comprises a series of integral triangularly shaped walls 84 spaced circumferentially around the cap that provide improved structural rigidity for tower 80 to a bottom wall 85 of the cap with which the tower is integrally formed. A clinch ring 86 engages an outer perimeter rim of wall 85 to securely attach cap 66 to shell 64 with radial sealing of the cap to the shell being provided by an O-ring 87 disposed in a radially outwardly open groove extending circularly around a portion of bottom wall that is below and radially inwardly of the wall's outer perimeter rim that is engaged by clinch ring 86. O-ring 87 provides a radial seal between the cap and the inside wall of shell 64 proximate the shell's top end.

Attention is now directed to details of the internal construction of EEGR valve 60 with continued reference to FIG. 5 and also to a number of subsequent drawing figures showing individual parts in greater detail.

Base 62 comprises an exhaust gas passageway 88 having an entrance 90 coaxial with axis 72 and an exit 92 that is spaced radially from entrance 90. Both entrance 90 and exit 92 register with respective passages in the engine exhaust manifold.

Figure 7:
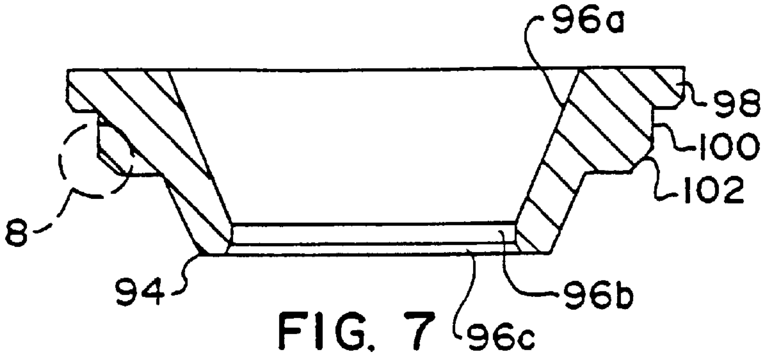
FIG. 7 is a cross sectional view taken in the direction of arrows 7—7 in FIG. 6.
Figure 8:
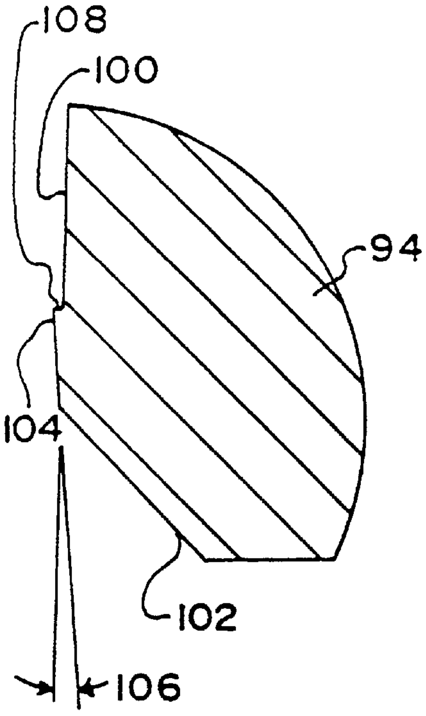
FIG. 8 is an enlarged view in circle 8 of FIG. 7.
Figure 6:
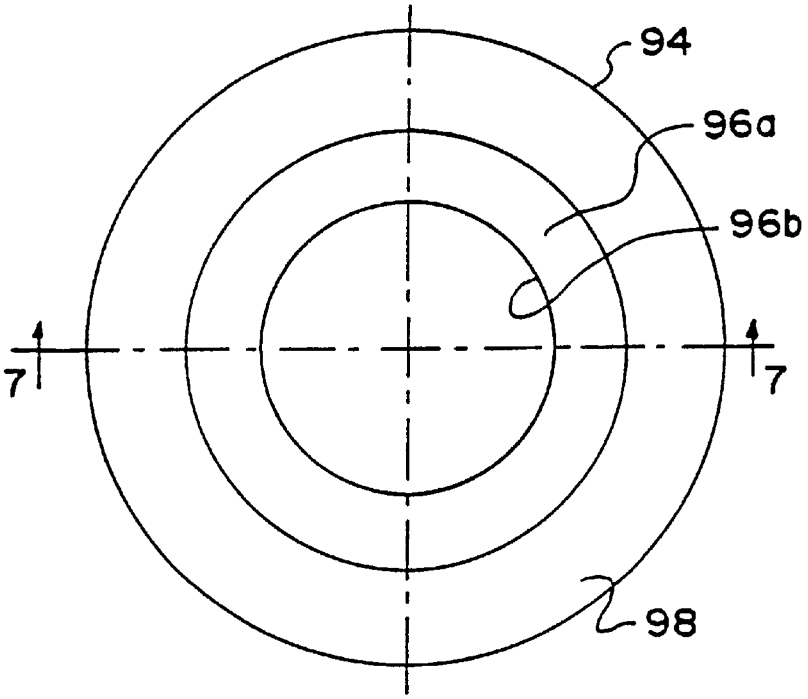
FIG. 6 is a top plan view of one of the parts of the EEGR valve shown by itself on an enlarged scale, namely a valve seat.
Figure 10:
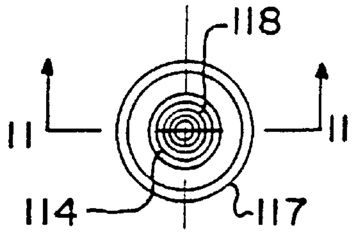
FIG. 10 is a top view of FIG. 9.
Figure 11:
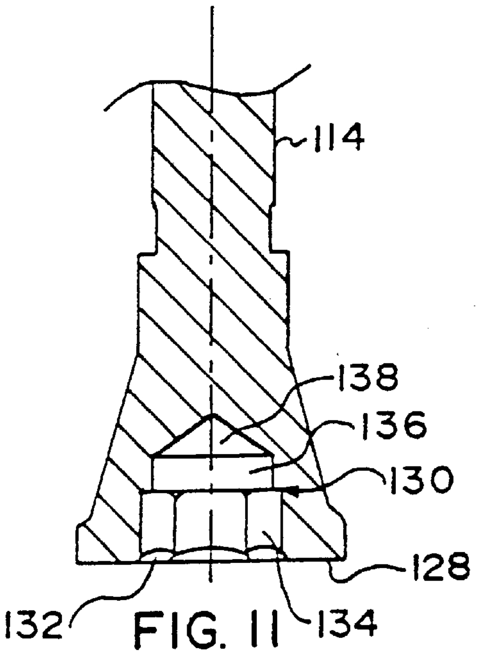
FIG. 11 is a fragmentary cross sectional view taken in the direction of arrows 11—11 in FIG. 10 on a larger scale.
Figure 9:
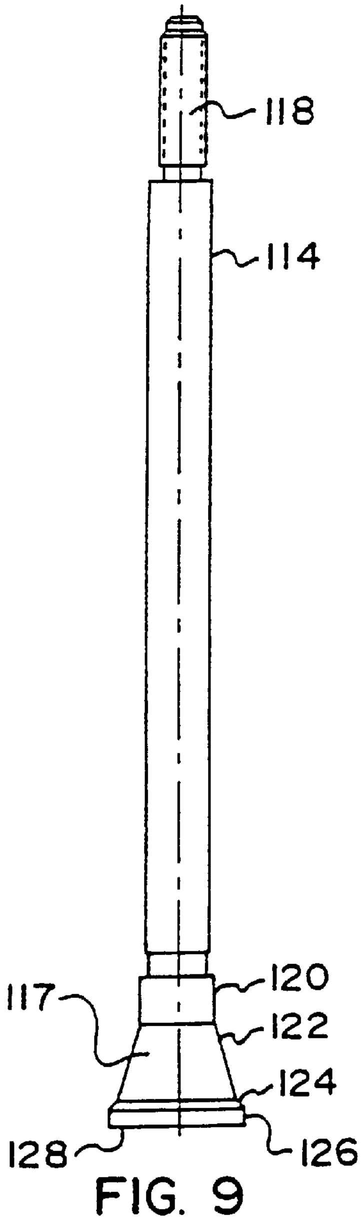
FIG. 9 is an elevational view of another of the parts of the EEGR valve shown by itself on a slightly enlarged scale, namely a pintle valve element.
Figure 12:
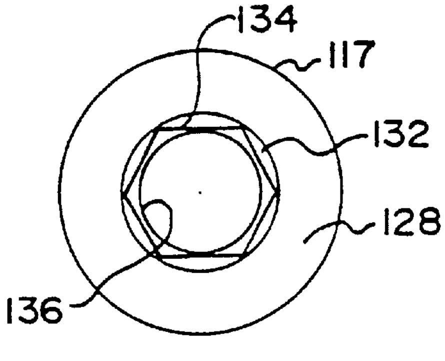
FIG. 12 is a full bottom view of FIG. 11 on the same scale.

A valve seat 94, details of which are shown in FIGS. 6, 7, and 8, is disposed in passageway 88 coaxial with entrance 90. Valve seat 94 has an annular shape comprising a through-hole having a frusto-conically tapered surface 96*a* extending from the top face of the valve seat to a straight circular cylindrical surface 96*b* extending to a frusto-conical chamfer 96*c* at the bottom of the valve seat. A circular perimeter rim 98 extends around the outside of valve seat 94 at the top. Immediately below rim 98, the outer perimeter surface of the valve seat comprises a straight circular cylindrical surface 100 that is coaxial with axis 72 and extends to a frusto-conical chamfer 102. Between surface 100 and chamfer 102 is a frusto-conically tapered surface 104 that begins at the upper circular edge of chamfer 102, which is essentially at the same diameter as surface 100. Surfaces 96*a*, 96*b*, 96*c*, and 104 are concentric. Surface 104 tapers outwardly toward the top of the valve seat at an angle designated by the numeral 106 in FIG. 8. It ends at a shoulder 108 that extends radially back to the lower edge of surface 100. Base 62 is constructed with a valve seat mounting hole that has a counterbore providing a shoulder 109 onto which rim 98 seats. Moreover, the provision of tapered surface 104 provides a wedge fit of the valve seat to base 62 when the valve seat is axially aligned with entrance 90 and pressed into the mounting hole in the base to seat rim 98 on shoulder 109. Rim 98 is then captured against shoulder 109 by means of staking a portion 110 of base 62 at the top edge of the mounting hole against the top surface of the rim. It is to be appreciated that FIG. 5 portrays the assembled position of valve seat 94 in base 62 and that the staking portion 110 is created by displacing material of base 62 after rim 98 has been seated on shoulder 109. The wedging fit provided by surface 104 being in interference with the wall of entrance 90 immediately below shoulder 109 provides a secure, accurate, and gas-tight assembly of the valve seat to the base.

FIG. 5 further shows that EEGR valve 60 comprises an armature-pintle assembly 112 that is coaxial with axis 72 and that comprises a pintle 114 and an armature 116. Details of pintle 114 are illustrated in FIGS. 9–12. Pintle 114 comprises a shaft having a head 117 at the lower end and a threaded stud 118 at the upper end. Head 117 is shaped for cooperation with seat 94 while stud 118 provides for attachment of the pintle to armature 116. Head 117 has an outer perimeter that is shaped to comprise a straight circular cylindrical surface 120 from the lower edge of which a frusto-conical tapered surface 122 flares radially outwardly to a further frusto-conical tapered surface 124 of larger taper, but shorter axial dimension, than that of surface 122. The pintle further comprises a flat bottom surface 128 that has a generally circular shape but contains a central blind hole 130. This blind hole comprises a chamfer 132 extending from surface 128 to a polygonally shaped surface 134 which in the illustrated embodiment is a hexagon shape. Immediately inwardly of surface 134 is a straight circular cylindrical surface 136 of slightly smaller diameter than the maximum diameter across surface 134. The innermost part of hole 130 is a conically shaped space 138 extending from surface 136 to a tip lying on axis 72. As can be seen in FIG. 5, which represents the closed position of EEGR valve 60, surface 124 seats against chamfer 96*c*. Preferably the taper of surface 124 is less than one degree smaller than that of chamfer 96*c*.

Figure 13:
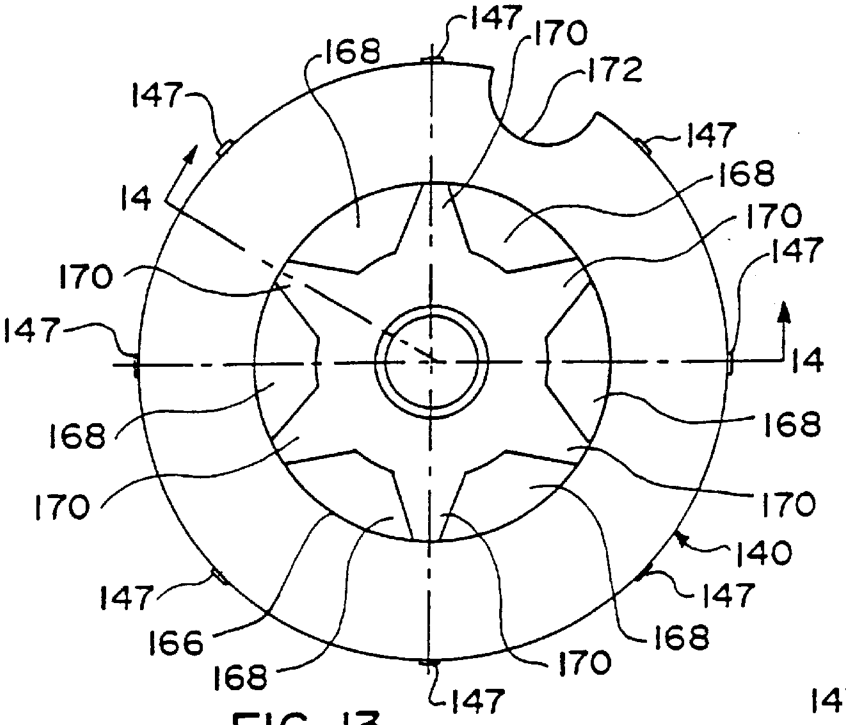
FIG. 13 is a top plan view of another of the parts of the EEGR valve shown by itself on an enlarged scale, namely a bearing guide member.
Figure 15:
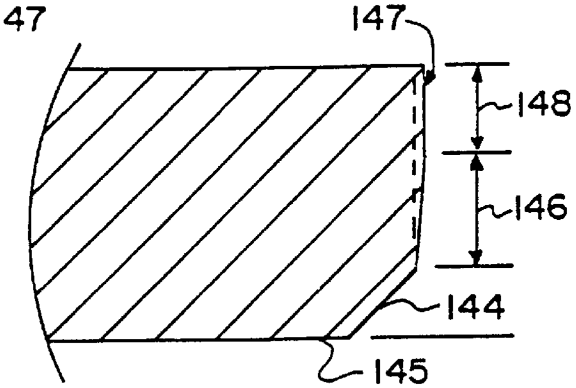
FIG. 15 is an enlarged view in circle 15 of FIG. 14.
Figure 14:
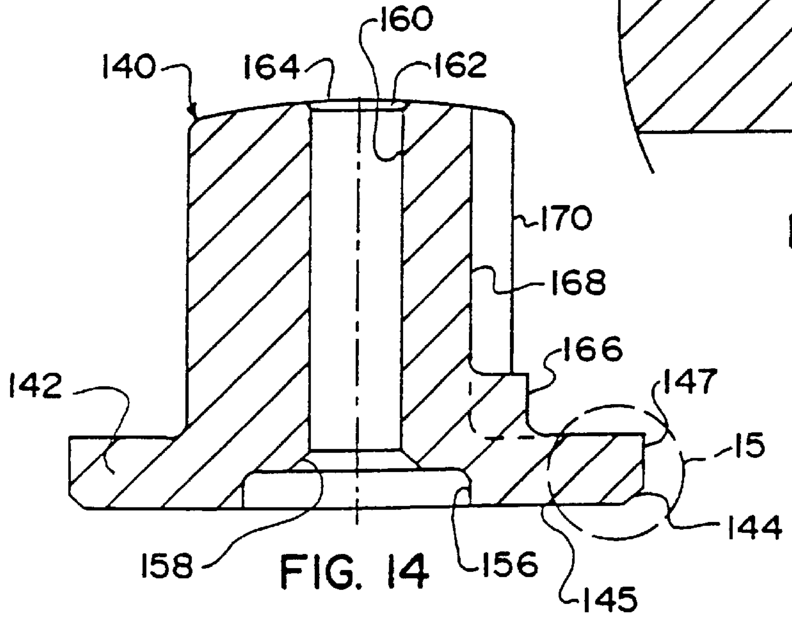
FIG. 14 is a cross sectional view as taken in the direction of arrows 14—14 in FIG. 13.

EEGR valve 60 further comprises a bearing guide member 140, details of which appear in FIGS. 13–15. Bearing guide member 140 comprises a circular flange 142 at the bottom. The radially outer surface of flange 142 comprises a chamfer 144 extending from the flat bottom surface 145 of the bearing guide member. At several circumferentially spaced apart locations, the outer perimeter of the flange comprises formations 147. Each formation comprises a frusto-conically tapered surface section 146 that tapers outwardly from the upper circular edge of chamfer 144 to a straight, circularly cylindrically contoured surface section 148. Each surface section 148 extends to the top of flange 142. There are eight such formations 147 distributed uniformly around the perimeter of flange 142 in the illustrated embodiment. The formations are dimensioned for a wedging fit of member 140 to a partially cylindrical wall surface 149 in base 62 (see FIG. 5) that is concentric with entrance 90, and hence with valve seat 94. Wall surface 149 is only partially cylindrical because that portion of passageway 88 that leads to exit 92 intersects this surface and hence there is no material available for forming the portion of wall surface 149 at the mutual intersection. This wedging fit of bearing guide member 140 to base 62 serves the purpose of accurately and securely locating the two parts in assembly.

Immediately below wall portion 149 is a shoulder 150. The outwardly turned upper rim 152 of a cup shaped metal shield 154 is captured between rim 142 and shoulder 150 after bearing guide member 140 has been pressed into assembly with base 62. Shield 154 comprises a central circular clearance hole 156 for passage of the shaft of pintle 114 therethrough.

FIG. 14 shows that bearing guide member 140 further comprises a central through-hole having a cylindrical portion 156 extending upwardly from the bottom surface of the bearing guide member to a frusto-conical surface 158 which in turn extends to a straight cylindrical surface 160 that occupies a majority of the overall axial length of the bearing guide member. The upper end of surface 160 ends at a chamfer 162, where the bearing guide member top surface 164 has a slight crown. The outside diameter of bearing guide member 140 above flange 142 comprises a ridge 166 that has a circular shape. Above ridge 166 and continuing to top surface 164 are a series of circumferentially spaced apart flutes 168 that cooperatively define a series of parallel ribs 170 extending axially from ridge 166. The plan shape of these ribs 170 can be seen in FIG. 13 which shows six such ribs by way of example. The radially outer surfaces of these ribs lie on a common circle that is concentric with axis 72 and provide for accurately centering a lower stator member 174 (FIG. 5) in the assembled EEGR valve 60. FIG. 13 also shows that flange 142 has a semi-circular notch 172 disposed between two immediately adjacent formations 147 in the outer surface of the flange. The outer perimeter of flange 142, ridge 166, and the radially outer surfaces of ribs 170 are concentric with the bearing guide member's central through-hole.

Figure 16:
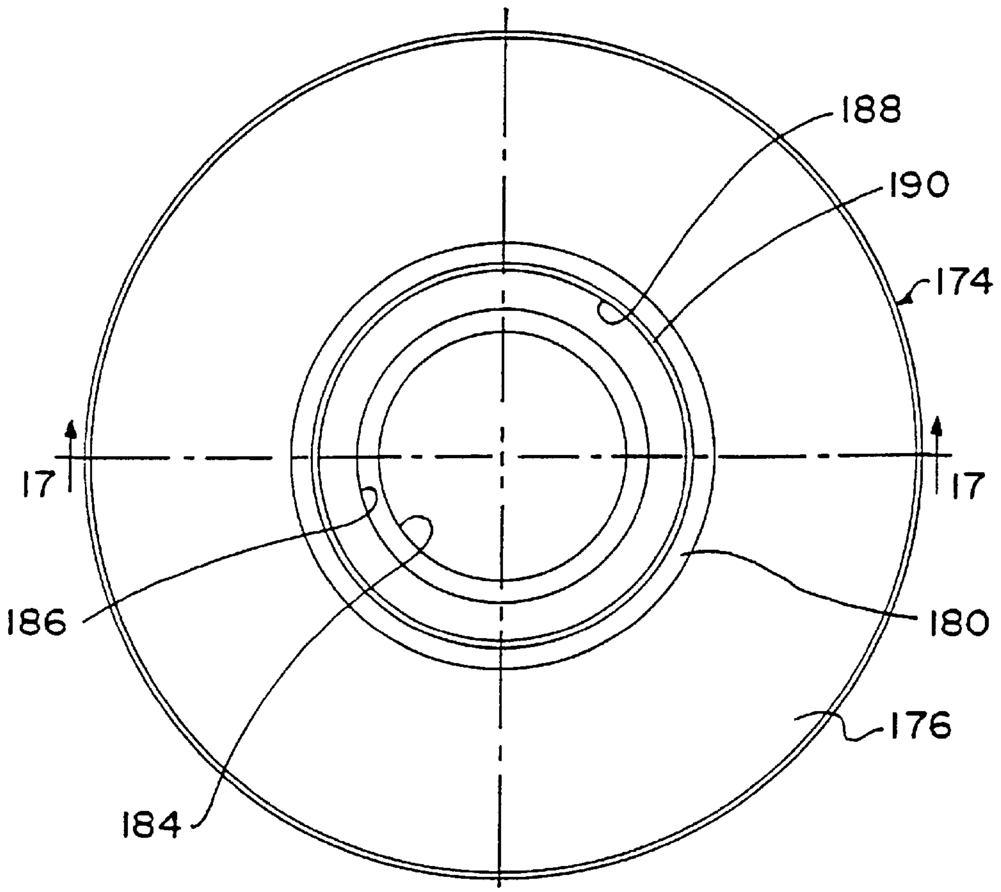
FIG. 16 is a top plan view of still another of the parts of the EEGR valve shown by itself on a slightly enlarged scale, namely a lower stator member.
Figure 17:
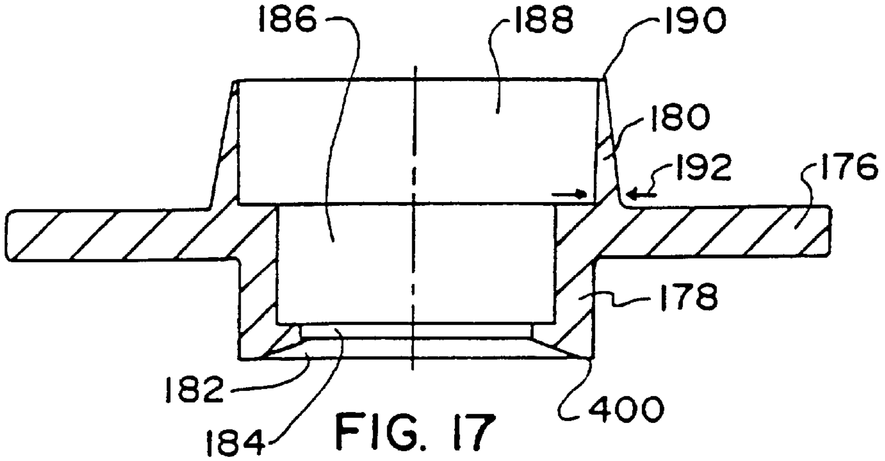
FIG. 17 is a cross sectional view as taken in the direction of arrows 17—17 in FIG. 16.

Details of lower stator member 174 appear in FIGS. 16 and 17. Member 174 comprises a circular flange 176 immediately below which is a smaller diameter cylindrical wall 178 having a radially inwardly directed rim 179 at its lower end. Immediately above flange 176 is a tapered cylindrical wall 180. A central through-hole of member 174 extends upwardly from an inwardly tapered surface 182 to a straight cylindrical surface 184. The latter expands to a larger diameter cylindrical surface 186 that extends to a still larger diameter cylindrical surface 188. The upper edge surface 190 of wall 180 is relatively pointed and although it does have a finite radial thickness, that thickness is considerably smaller than the radial thickness 192 at the base of wall 180. The relatively pointed tapering of wall 180 is for the purpose of enhancing the magnetic circuit characteristics of the magnetic circuit of EEGR valve 60, to be hereinafter described in detail. Surfaces 182, 184, 186 are concentric with the radially inner perimeter of rim 179 and with the radially outer perimeter of flange 176.

Figure 18:
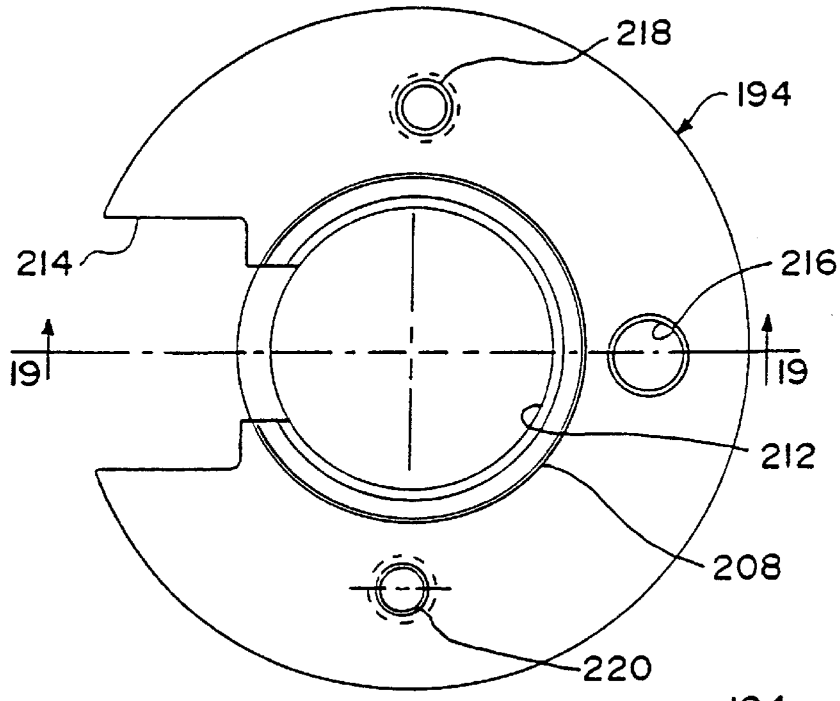
FIG. 18 is a top plan view of yet another part of the EEGR valve shown by itself, namely an upper stator member.
Figure 20:
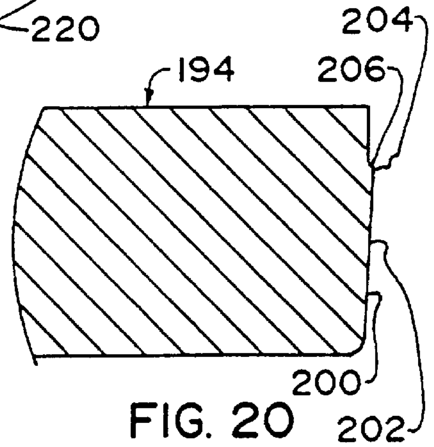
FIG. 20 is an enlarged view in circle 20 of FIG. 19.
Figure 19:
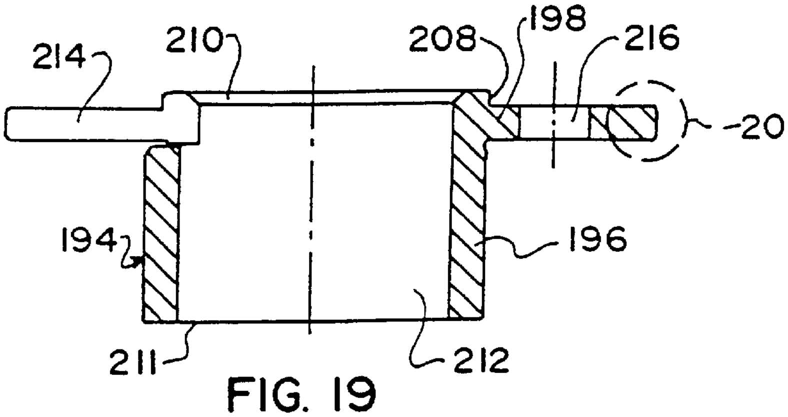
FIG. 19 is a cross sectional view as taken in the direction of arrows 19—19 in FIG. 18.

Valve 60 farther comprises an upper stator member 194 that is cooperatively associated with lower stator member 174 in the magnetic circuit. Details of upper stator member 194 appear in FIGS. 18–20. Member 194 comprises a straight cylindrical side wall 196 having a flange 198 extending around its outside proximate its upper end. The outer perimeter surface of flange 198 is constructed to have a wedging press fit to the inside wall of shell 64 and comprises a straight cylindrical section 200 extending upwardly from its lower face to an outwardly tapered surface 202. Surface 202 terminates at a shoulder 204 that extends radially inwardly back to a cylindrical surface 206 that extends to the upper face of the flange. In the assembled valve 60, member 194 is pressed into the shell 64 so that flange 198 has a wedged press-fit against a portion of the side wall surface contiguous an internal shoulder **64*b* (FIG. 5) of shell 64 while the flange axially abuts the shoulder. The upper stator member further comprises a straight cylindrical through-hole 212 extending from a small chamfer 211 at the bottom of side wall 196 to a larger chamfer 210 at a raised ridge 208 at the top end of the member. A slot 214 is provided in a portion of flange 198 and ridge 208 to provide a clearance for an electrical connection between cap 66 and a bobbin assembly 222 (see FIG. 5) that is disposed within shell 64 in cooperative association with the two stator members. Additionally, flange 198 comprises a through-hole 216 diametrically opposite slot 214 and two smaller through-holes 218, 220 at 90 degrees from hole 216**.

FIG. 5 shows solenoid coil assembly 222 disposed within shell 64 between stator members 174 and 194. Solenoid coil assembly 222 comprises a non-metallic bobbin 224 having a straight cylindrical tubular core 226 coaxial with axis 72, and upper and lower flanges 228 and 230 at the opposite axial ends of core 226. A length of magnet wire is wound on core 226 between flanges 228, 230 to form an electromagnet coil 232.

Figure 32:
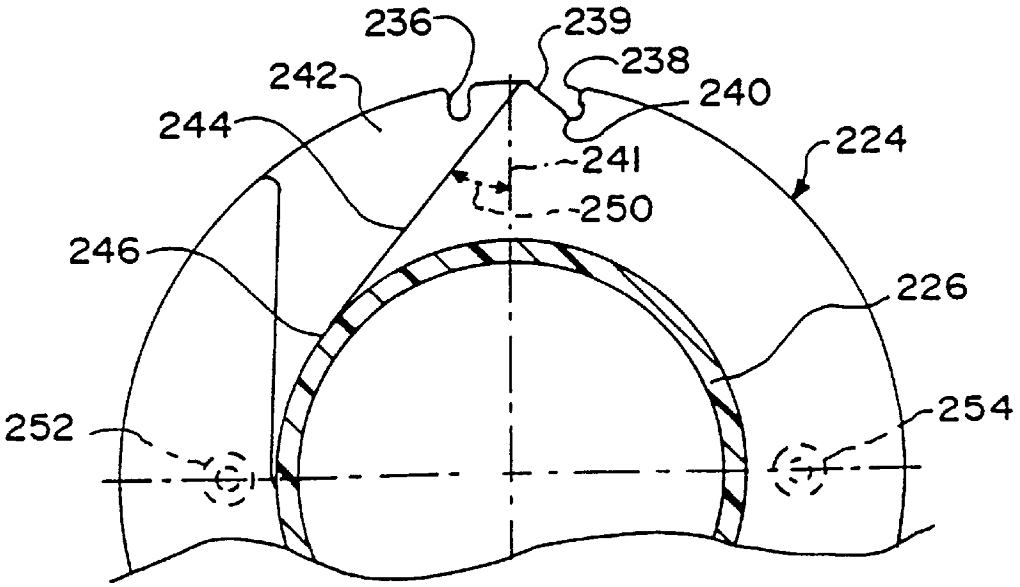
FIG. 32 is a fragmentary cross sectional view as taken in the direction of arrows 32—32 in FIG. 30.
Figure 33:
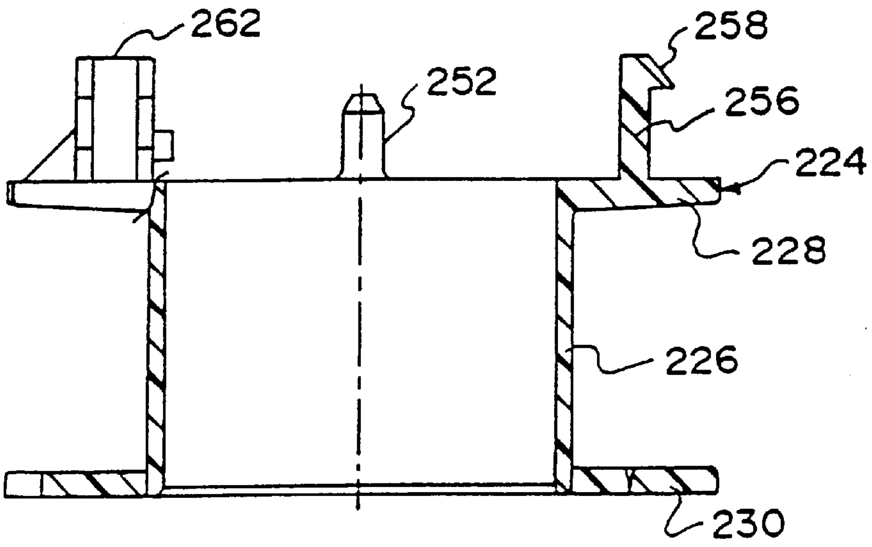
FIG. 33 is a cross sectional view as taken in the direction of arrows 33—33 in FIG. 29.
Figure 34:
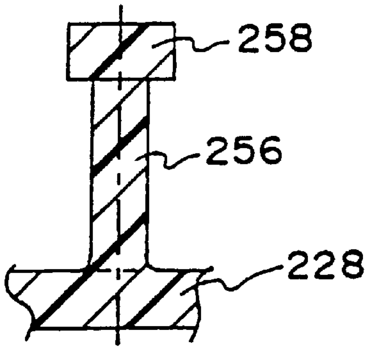
FIG. 34 is a fragmentary view, on an enlarged scale, as taken in the direction of arrows 34—34 in FIG. 29.
Figure 36:
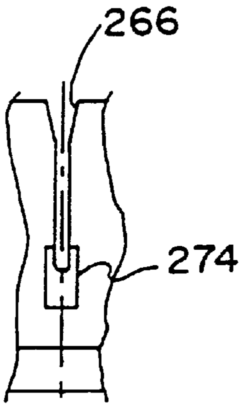
FIG. 36 is a fill left side view of FIG. 35.
Figure 35:
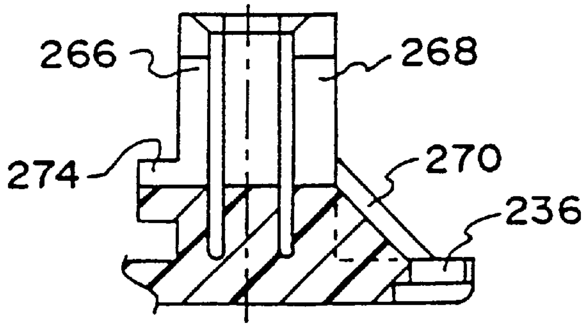
FIG. 35 is an enlarged cross sectional view as taken in the direction of arrows 35—35 in FIG. 30.
Figure 38:
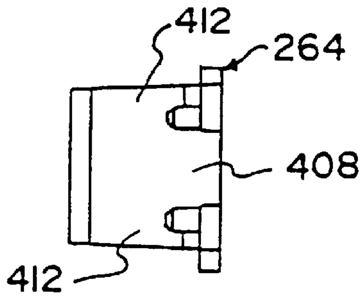
FIG. 38 is a top plan view of FIG. 37.

Detail of bobbin 224 appears in FIGS. 29–36 in a condition prior to winding of coil 232. The bobbin is preferably an injection-molded plastic that possesses dimensional stability over a range of temperature extremes that are typically encountered in automotive engine usage. Lower flange 230 has a circular shape whose outer perimeter is interrupted at one location by a small inwardly extending slot 234. Upper flange 228 also has a circular shape, but its outer perimeter is interrupted by two closely adjacent slots 236 and 238 that have somewhat different shapes. Slot 236 is basically U-shaped. One side of slot 238 is slightly more than a half-U-shape while the other side 239 runs along a straight line extending from a point of tangency 240 with the first side at about 55 degrees to a radial 241 to where it meets the circular outer perimeter of the flange. The lower face of flange 228 comprises an indentation 242 that is seen in FIG. 32 to be somewhat triangularly shaped. Indentation 242 comprises an edge surface 244 that extends from a point of tangency 246 with the O.D. of core 226 to a location on the perimeter of flange 228 that is between slots 238 and 236. Edge surface 244 makes an angle 250 with radial 241 that is approximately 35 degrees.

The upper face of flange 228 contains two upstanding cylindrical posts 252 and 254 that are diametrically opposite each other and equidistant from axis 72 and whose upper ends are tapered. At 90 degrees to both posts 252, 254 is a further upright post 256 having a generally rectangular shape with a radially outwardly projecting overhang 258 at its top that is also slightly wider in the circumferential sense about axis 72.

Generally diametrically opposite post 256 on the upper face of flange 228 are a pair of upright, side-by-side, walled sockets 260 and 262. Each socket is adapted for receiving a respective electrical terminal like the one depicted in FIGS. 37–40 (to be described in detail later) and to provide for the electrical connection of a respective terminal with a respective end segment of the magnet wire forming coil 232. FIG. 5 shows one such terminal 264 received in a respective one of the sockets. Each socket has a generally rectangular wall that is open at the top for insertion of a terminal. The opposed radially inner and radially outer portions of each socket wall contain straight narrow slots 266 and 268 respectively that are in parallel and mutual alignment across the respective socket. The slots are open at the top where they have a lead that facilitates the passage of respective segments of the coil magnet wire into the slots, as will be explained in greater detail later on. A respective grooved ramp 270 and 272 slopes upwardly from a respective slot 236, 238 to the bottom of the radially outer slot 268 of a respective socket 260, 262. A respective short grooved track 274 and 276 is provided on the radially inner wall of the respective socket 260, 262 slightly above the upper face of flange 228, each track 274, 276 having a groove that extends from the bottom of the radially inner slot 266 of the respective socket 260, 262 toward the open center of the bobbin as viewed in plan.

Figure 37:
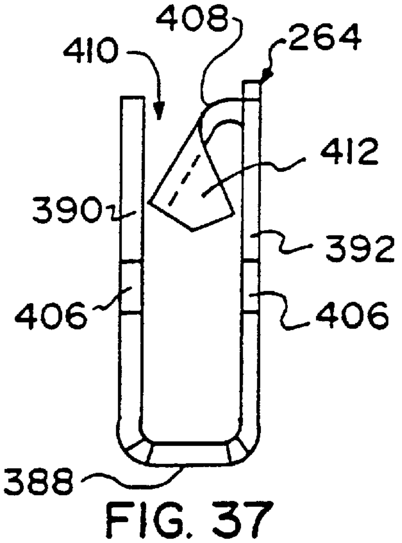
FIG. 37 is a front elevational view of yet another part of the EEGR valve shown by itself on a larger scale than in FIG. 5, namely an electrical terminal.
Figure 40:
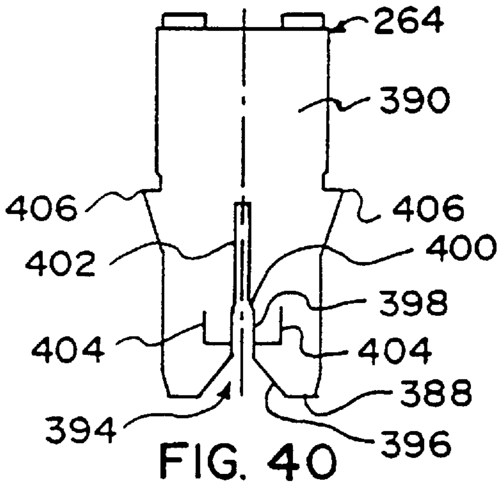
FIG. 40 is a left side elevational view of FIG. 37.
Figure 39:
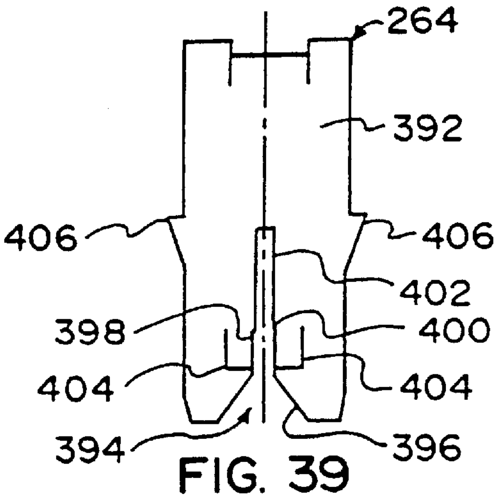
FIG. 39 is a right side elevational view of FIG. 37.
Figure 41:
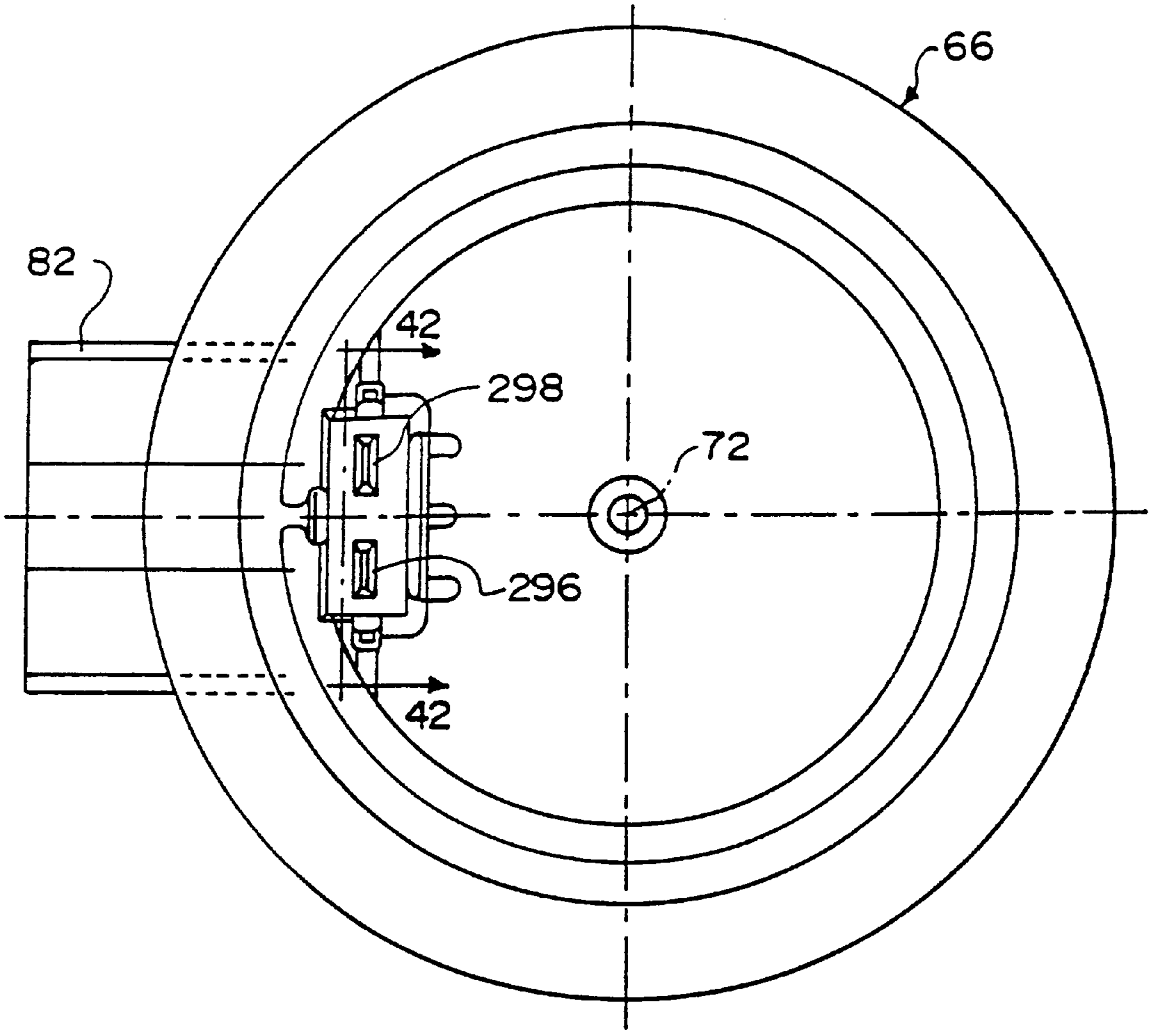
FIG. 41 is a bottom plan view of yet another part of the EEGR valve, namely a sensor cap.
Figure 42:
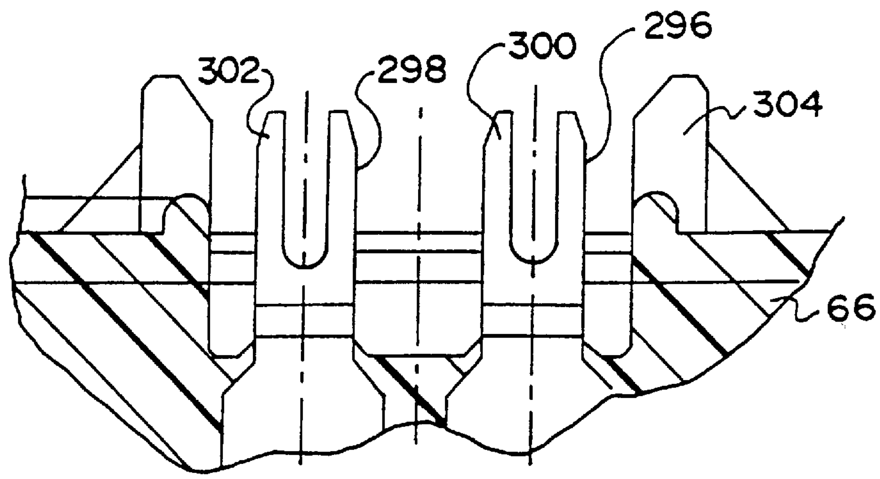
FIG. 42 is a fragmentary cross sectional view, on an enlarged scale, as taken in the direction of arrows 42—42 in FIG. 41.

FIGS. 37–40 illustrate an electric terminal 264 prior to its insertion into a respective one of the sockets 260, 262. Terminal 264 is fabricated as a single piece from flat strip stock to comprise a generally U-shaped body having a base 388 whose opposite ends join with flat sides 390 and 392 respectively along 90 degree radii, as shown by FIG. 37. Each side contains a centrally located axial slot 394 that is open at base 388 and extends upwardly therefrom for about one-half the overall axial length of the side. At base 388, a slot 394 comprises an entrance lead 396 that extends to a straight section 398 which in turn extends via a tapered section 400 to a narrower straight section 402. The material is slit, as shown at 404 in FIGS. 39 and 40, adjacent each side of section 398. The outer edges of sides 390, 392 contain pointed retention barbs 406. A somewhat T-shaped tab 408 inclines downwardly and inwardly from the central portion of the top edge of side 392, stopping short of the opposite side 390 to provide an insertion space 410 for a mating terminal (not shown). The wings 412 of the T-shape are curled back toward, but stop short of, side 392.

The method of fabricating the solenoid coil assembly will now be briefly explained. Magnet wire is tightly wrapped around post 256 below overhang 258. It is then brought across the bobbin to run in and along the groove of track 274, thence pass through slot 266 of socket 260 and across the socket's interior to exit the socket by passing through slot 268. From slot 268 the magnet wire runs in and along the groove of ramped track 270 to enter slot 236 where it loops around the edge of the slot to the bottom face of flange 228. The magnet wire extends within recess 242 from the edge of slot 236 to tangency with core 226 where it begins to form convolutions around the core between the bobbin flanges to ultimately create the electromagnet coil 232. By "precision winding" of the coil, maximum convolutions are placed in minimum space, and they are accurately located so that the electromagnetic characteristics of the coil are accurately defined.

Magnet wire extends from the final convolution of the coil to slot 238 where the magnet wire loops around the edge of the slot to the upper face of flange 228. The magnet wire extends from slot 238 to run in and along the groove in ramped track 272 and thence enter socket 262 by passing through slot 268 of that socket. The magnet wire passes across the interior of the socket, exiting via slot 266 to run in and along the groove in track 276. Upon leaving track 276, the magnet wire extends across the bobbin to an end segment of the magnet wire that is wrapped, or tied, securely around post 256.

At all times during the running of the magnet wire on the bobbin, it is kept tensioned so that not only are the coil convolutions tensioned, but also the segments that extend from the coil to post 256.

Terminals 264 are then assembled by aligning each with the open end of a respective socket 260, 262 and forcefully inserting them into the sockets. As a terminal is being inserted into a socket, the portion of the magnet wire spanning the interior of the socket enters slots 394. Leads 396 facilitate entry into the narrow portions of the slots. When the terminal has been fully inserted, the magnet wire is lodged in section 402 in electric contact with the terminal. Each slot is dimensioned in relation to the diameter of the magnet wire to scrape away the thin insulation covering the magnet wire so that the electric contact is thereby established. Barbs 406 embed slightly into the wall of the socket to securely retain the terminal in the socket. The tensioned magnet wire running across the interior of each socket is also wedged in the terminal slots so that the magnet wire is maintained in tension.

The process is completed by severing, or shearing, both tracks 274, 276 at the location where they join their respective sockets, severing the magnet wire in the process, and by shearing post 256 from flange 228 at the base of the post.

Figure 43:
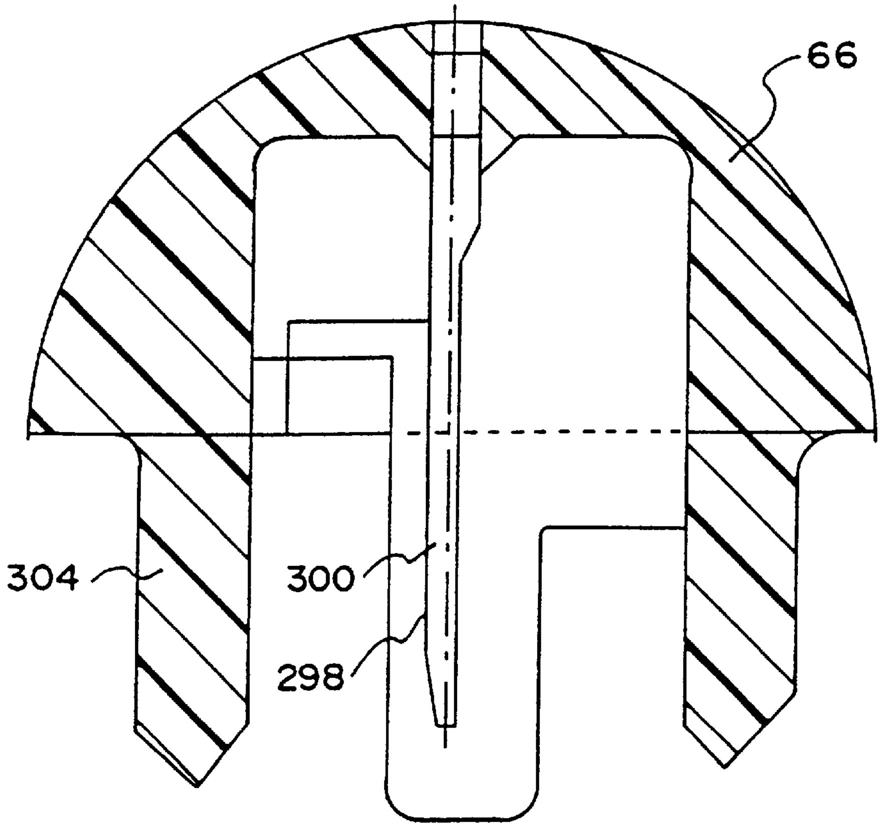
FIG. 43 is a fragmentary cross sectional view, on an enlarged scale, as taken in the direction of arrows 43—43 in FIG. 42.

Cap 66 is also an injection-molded plastic part, and its details can be seen in FIGS. 3, 5, and 41–43. Surrounded by shell 82 are end portions of five electrical terminals 290, 292, 294, 296, and 298. Terminals 290, 292, 294 provide for electrical connection of the sensor within tower 80 to the engine electrical system, while terminals 296, 298 provide for electrical connection of coil 232 with the system. Each terminal 296, 298 is a blade-type that a flat end portion within shell 82 and an opposite end portion adapted for mating connection with a respective terminal 264 in a respective socket 260, 262. Each terminal 296, 298 has an intermediate 90 degree bend so that the opposite end portions are at a right angle to each other, with the end that mates with a terminal 264 having its length parallel to axis 72 and its width perpendicular to its length as viewed in FIG. 42. That Fig. further shows that this end of each terminal 296, 298 comprises a respective forked blade 300, 302 both of which are disposed within a surrounding shell 304 of the cap. FIG. 43 shows that each forked blade has a reduced thickness from that of the portion that is embedded within the plastic of cap 66. This allows the forked blades to be deflected in cantilever-like fashion, as shown in FIG. 5, when mated with a respective terminal 264. Shell 304 is shaped for fitting to sockets 260, 262, as also shown in FIG. 5.

Figure 26:
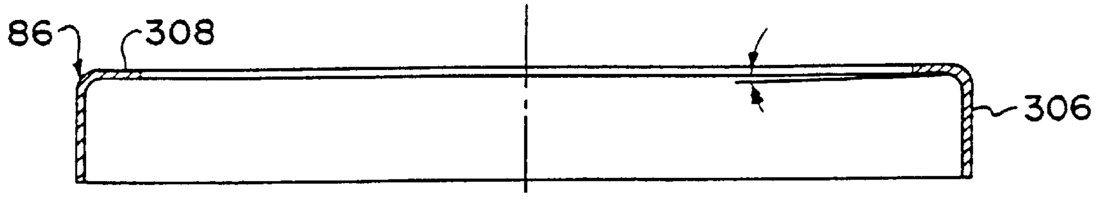
FIG. 26 is a cross sectional view as taken in the direction of arrows 26—26 in FIG. 25.
Figure 27:
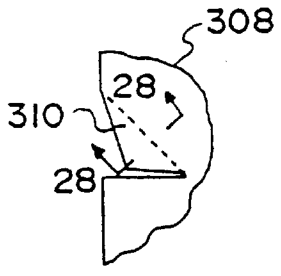
FIG. 27 is an enlarged fragmentary view in circle 27 of FIG. 25.
Figure 28:
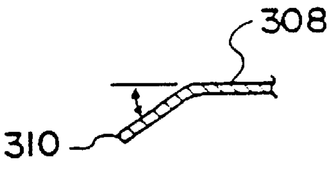
FIG. 28 is a fragmentary cross sectional view as taken in the direction of arrows 28—28 in FIG. 27.
Figure 29:
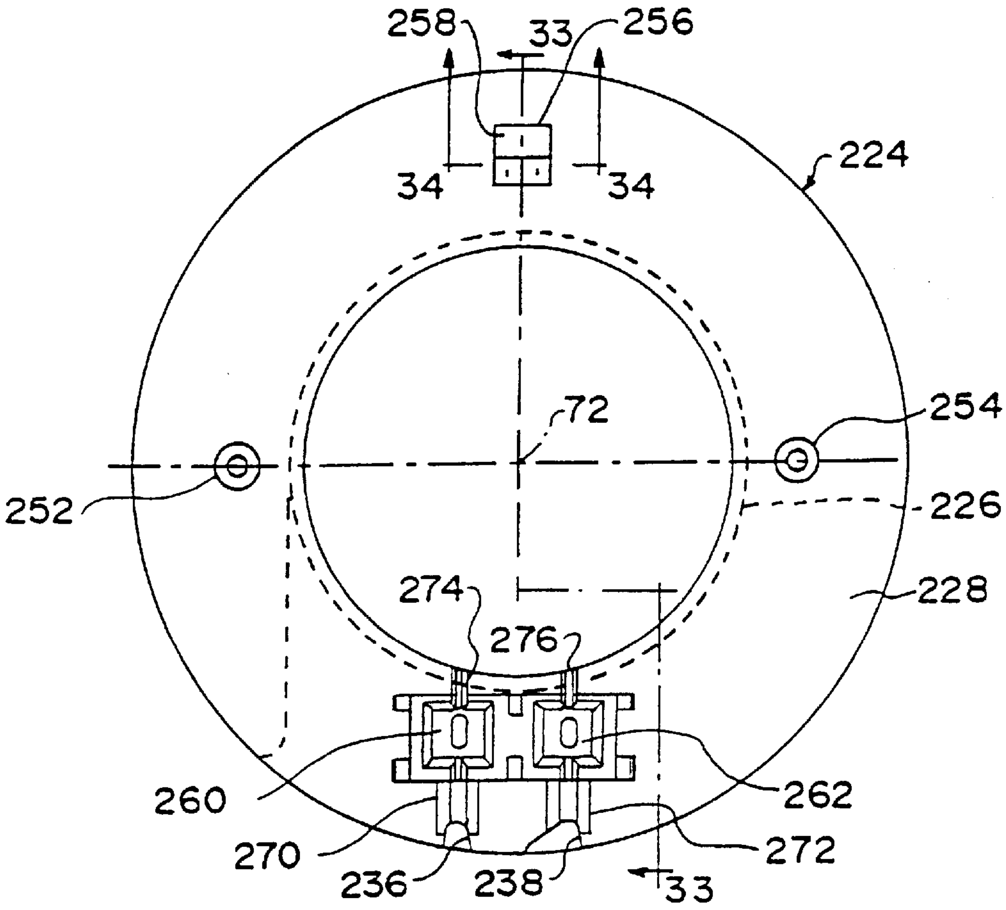
FIG. 29 is a top plan view of still another of the parts of the EEGR valve shown by itself on a slightly enlarged scale, namely a bobbin.
Figure 30:
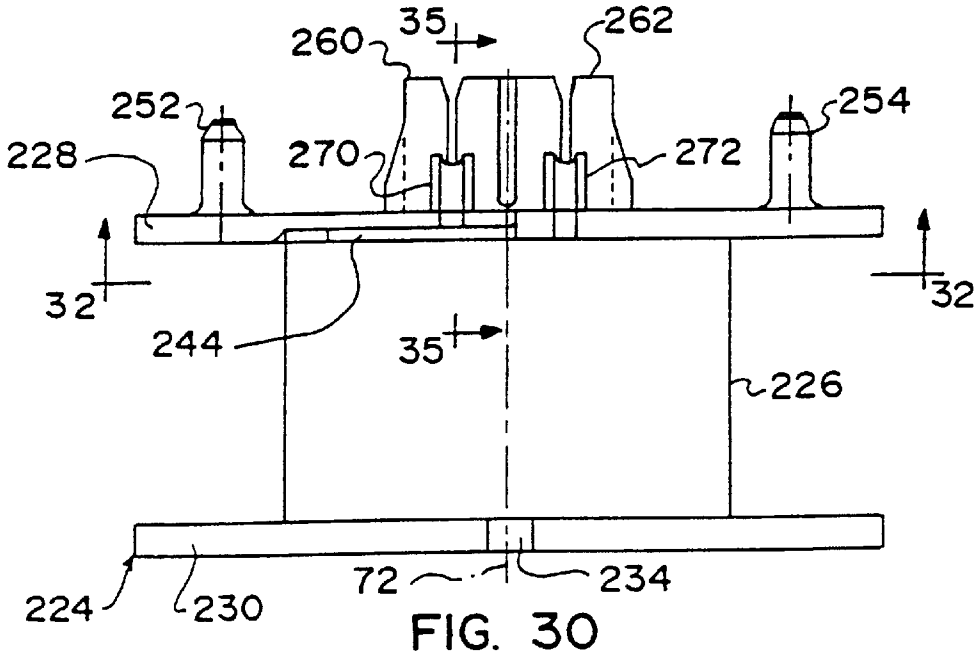
FIG. 30 is a front elevational view of FIG. 29.
Figure 31:
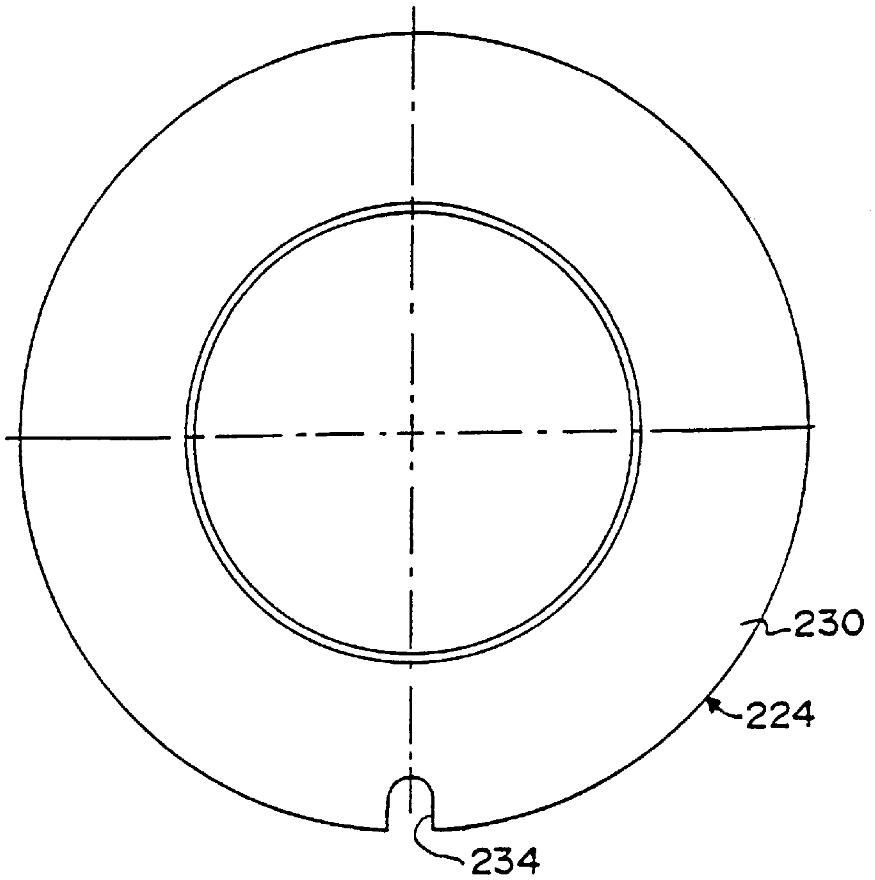
FIG. 31 is a bottom plan view of FIG. 30.

FIGS. 25–28 show the shape of clinch ring 86 prior to its being formed to the shape shown in FIG. 5. It comprises a cylindrical side wall 306 and an upper circular flange 308 projecting radially inward from the upper end of the side wall. FIG. 26 shows that flange 308 is at slightly less than a right angle to side wall 306. The radially inner edge of flange 308 also contains integral downward turned pointed barbs 310, the illustrated embodiment having four such barbs at ninety degree intervals around the ring by way of example. These barbs will bite slightly into the polymeric material of the outer perimeter rim of wall 85 of cap 66 in the finished valve 60 to aid in resisting rotational displacement of the cap relative to shell 64. Two barbs point in one circumferential sense while the remaining two point in the opposite circumferential sense.

After the cap has been placed onto the top of shell 64, the clinch ring is placed over the abutting perimeter rims of the cap and shell, and the lower portion of side wall 306 is turned inwardly to the position shown by FIG. 5. The initial shape of clinch ring 86 provides for a final shape that applies an axial holding force that effectively immovably clamps the two parts 64, 66 together, so that neither axial nor circumferential movement between them can occur.

Figure 44:
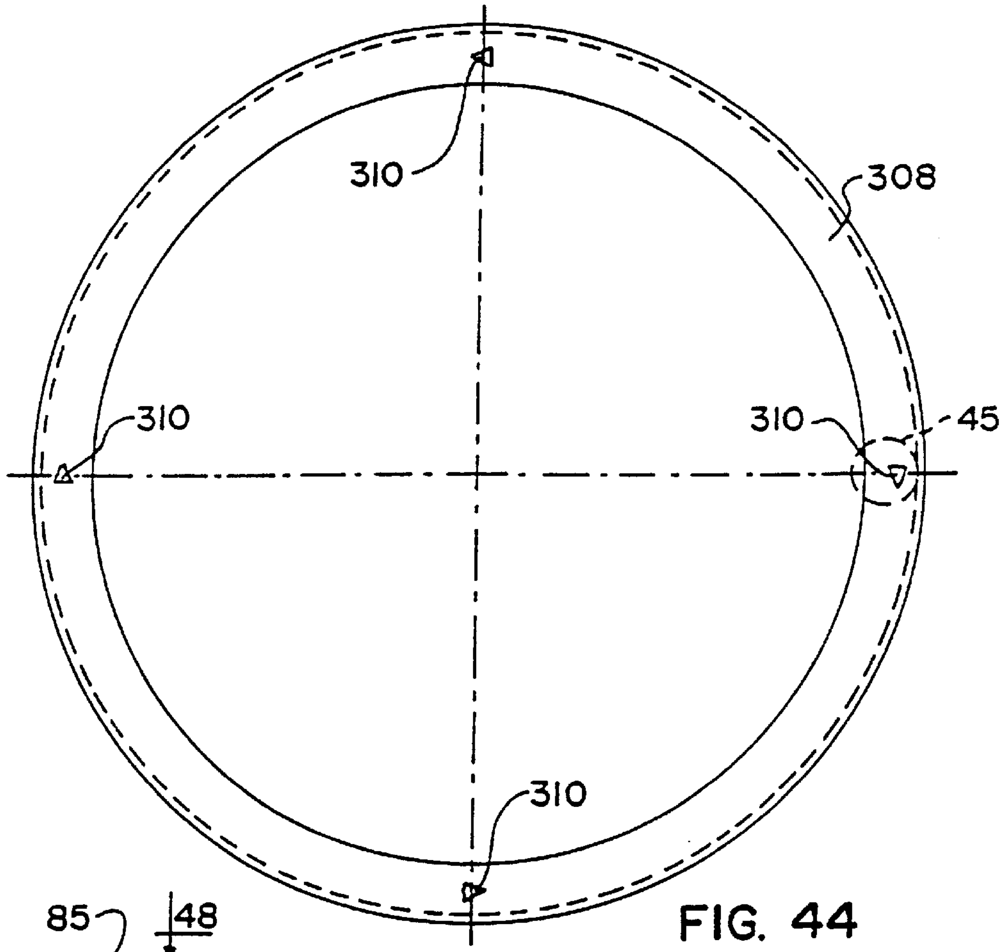
FIGS. 44, 45, and 46 are views of another form of clinch ring corresponding to the views of FIGS. 25, 27, and 28 respectively.
Figure 45:
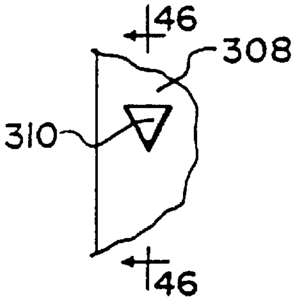
Figure 46:
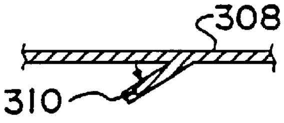

FIGS. 44–46 show an alternate form of clinch ring which is like the one of FIGS. 25–28, but for the shape and location of barbs 310. In this alternate embodiment, the barbs are lanced from material of the upper flange that is spaced inwardly from the flange inner edge. Each barb points circumferentially as viewed in plan, two in one sense, two in the opposite sense, and is symmetrical about its pointed tip.

Figure 47:
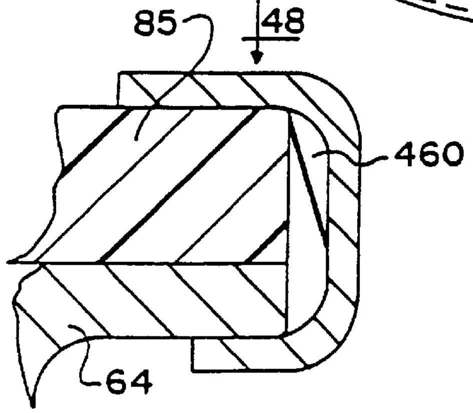
FIG. 47 is an enlarged fragmentary cross section view in the same direction as FIG. 5 showing yet another form of clinch ring.
Figure 48:
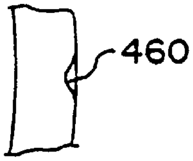
FIG. 48 is a fragmentary view in the direction of arrow 48 in FIG. 47 on a reduced scale.
Figure 49:
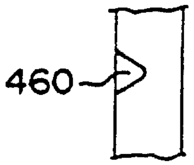
FIG. 49 is a right side view of FIG. 48.

FIGS. 47–49 show yet an other form of clinch ring which has a number of circumferentially spaced embossments 460, instead of the barbs 310. The embossments are formed by displacing material from the top flange and the side of the clinch ring at their junction. Immediately proximate the top flange, each embossment will engage the outer edge of the rim of cap bottom wall 85 when the clinch ring is clinched onto the abutting rims of the cap and shell.

Returning once more to FIG. 5, one can see that upper stator member 194 and solenoid coil assembly 222 have been joined to form an assembly. The joining is done by placing upper stator member 194 onto the top of bobbin 224 such that posts 252, 254, while still in the condition shown in FIGS. 29 and 30 but after coil 232 has been wound on core 226 and electric terminals 264 inserted into their sockets, pass through the holes 218, 220 in flange 198 of the upper stator member. The tapered ends of the posts are then deformed to create heads 314 that cooperate with upper bobbin flange 228 to capture the stator flange 198 between themselves. It should be noted that FIG. 5 shows one post and its head 314 ninety degrees out of position circumferentially, for illustrative clarity only. The juncture of flange 198 and wall 196 has a small undercut 197 for assuring that the upper bobbin flange is disposed flat against the upper stator member flange.

Figure 21:
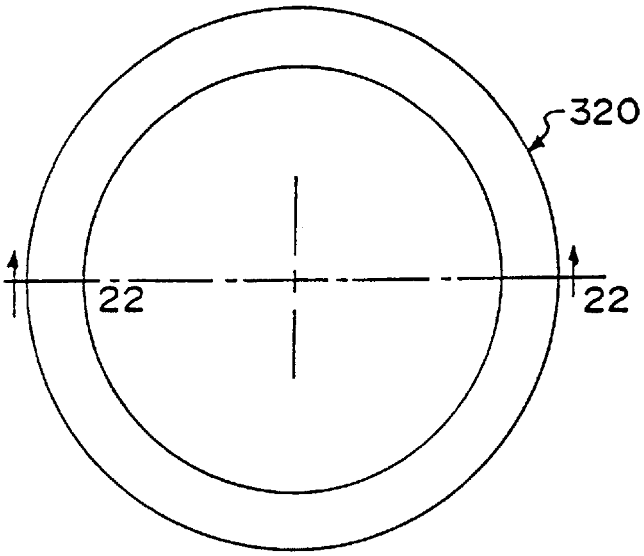
FIG. 21 is a top plan view of another of the parts of the EEGR valve shown by itself on a slightly enlarged scale, namely a spring washer.
Figure 22:
FIG. 22 is a cross sectional view as taken in the direction of arrows 22—22 in FIG. 21 on a slightly larger scale.

FIG. 5 shows a spring wave washer 320 disposed between lower bobbin flange 230 and flange 176 of lower stator member 174. Details of spring wave washer 320 are shown in FIGS. 21–22. Wave spring washer 320 serves to assure that upper bobbin flange 228 is maintained against upper stator flange 198 should there be any looseness in the bobbin flange attachment to the upper stator flange provided by posts 252, 254 and their heads 314. Under extremely harsh operating conditions, the polymeric material of the bobbin and its two integral posts with their formed heads might experience expansion and/or creep that would cause looseness, but this is prevented by the action of wave spring washer 320 keeping the upper bobbin flange against the upper stator flange. The spring characteristic of wave washer 320 can also keep the rim of flange 176 forcefully seated against an internal shoulder 64*a* of shell 64, although the press-fit of the lower stator member to bearing guide member 140 should not result in axial separation of the rim of flange 176 from shoulder 64*a*.

The upper stator/solenoid coil assembly is accurately and securely located within shell 64 by virtue of the previously described press fitting of flange 198 to the side wall of shell 64 adjoining shoulder 64*b* and abutting the flange with the shoulder. The upper and lower stator members are accurately axially positioned relative to one another by accurately controlling the axial distance between the two shoulders 64*a* and 64*b* in shell 64. Since both shoulders are in a single part, tighter tolerancing of that axial distance is made possible.

Greater control of the concentricity of the two stator members is also made possible by shell 64. By controlling the concentricity of the hole in the bottom wall of shell 64 into which ridge 166 of bearing guide member 140 is pressed, to the concentricity of shoulder 64*b*, the bearing guide member's concentricity is controlled, and through the press fit of lower stator member 174 to the bearing guide member, the concentricity of the lower stator member is controlled. Consequently, concentricity of the lower stator member to the upper stator member is controlled through only two other parts, namely shell 64 and bearing guide member 140. Shoulder 64*a* is made sufficiently wide not to interfere with this control, and so while lower stator flange 176 is abutted with shoulder 64*a*, it has radial clearance to the adjoining portion of the shell side wall.

The accurate relative positioning of the two stator members, both axially and radially, is important in achieving the desired air gap in the magnetic circuit that is provided by the two stator members and shell 64, all of which are ferromagnetic. The air gap is designated 322 is present between the respective walls 180 and 196 of the respective stator members.

A portion of armature 116 axially spans air gap 322, radially inward of walls 180 and 196. A non-magnetic sleeve 326 is disposed in cooperative association with the two stator parts and armature-pintle assembly 112. Sleeve 326 has a straight cylindrical wall 328 extending from an outwardly curved lip 330 to keep armature 116 separated from the two stator members. Sleeve 326 also has a lower end wall 332 that is shaped for seating on lower stator member 174 and for providing a spring seat 334 for a helical coil spring 336. Wall 332 also provides an upper boundary for an interior space 329 where the upper crowned end of bearing guide member 140 is disposed, but it also has a central hole to allow the shaft of pintle 114 extending out of the bearing guide member end to pass through.

Armature 116 is ferromagnetic and comprises a cylindrical wall 340 coaxial with axis 72 and a transverse internal wall 342 across the interior of wall 340 at about the middle of the length of wall 340. Wall 342 has a central hole that provides for the upper end of pintle 114 to be attached to the armature by the fastening means that includes a calibration nut 346, a shim 348, a wave spring washer 350. Wall 342 also has three smaller bleed holes 352 spaced outwardly from, and uniformly around its central hole.

Shim 348 is circular in shape having flat, mutually parallel end wall surfaces between which extends a straight circular through-hole that is coaxial with axis 72. The shim's O.D. is tapered, as shown. Shim 348 serves three purposes: 1) to provide for passage of the upper end portion of pintle 114; 2) to provide a locator for the upper end of spring 336 to be substantially centered for bearing against the lower surface of wall 342; and 3) to set a desired axial positioning of armature 116 relative to air gap 322, specifically, relative to lower stator member 174.

Figure 23:
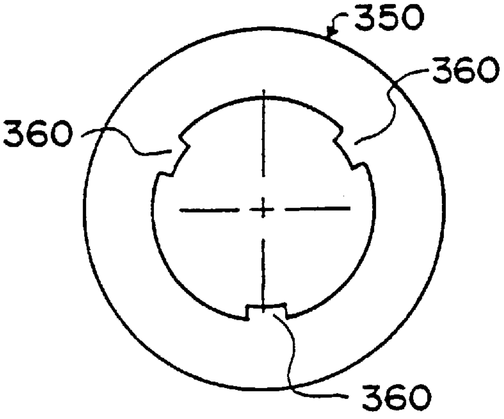
FIG. 23 is a top plan view of still another of the parts of the EEGR valve shown by itself on a larger scale than in FIG. 5, namely a spring washer.
Figure 24:
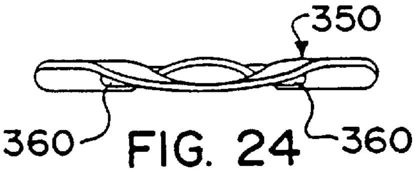
FIG. 24 is a front elevational view of FIG. 23.
Figure 25:
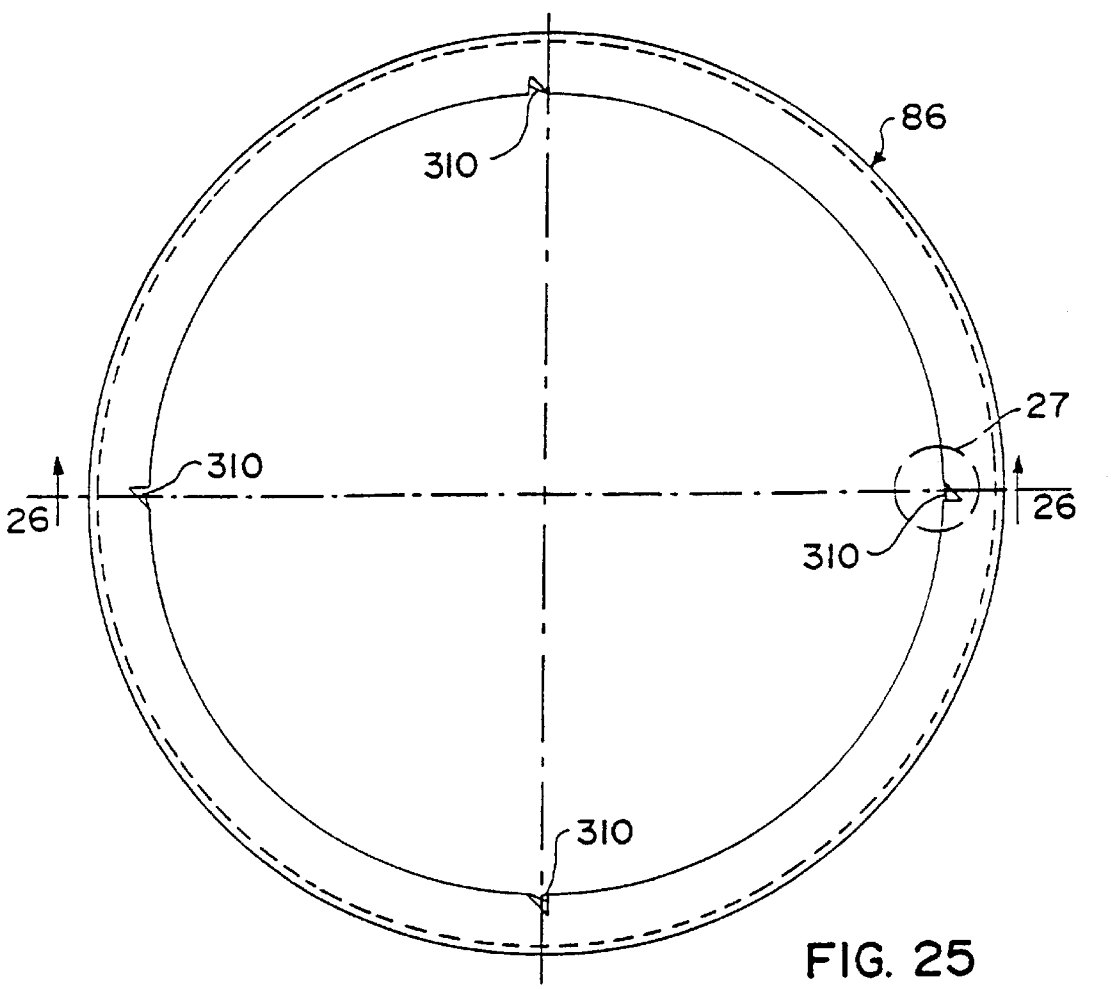
FIG. 25 is a top plan view of yet another part of the EEGR valve shown by itself in a condition prior to assembly to the EEGR valve, namely a clinch ring.

Detail of wave spring washer 350 is shown in FIGS. 23 and 24 in its uncompressed shape. It has the annular shape of a typical wave spring washer, but with three tabs 360 equally spaced about its inner perimeter that are dimensioned for a very slight interference fit with a portion of calibration nut 346 to allow it to be retained on the nut for assembly convenience when attaching the pintle to the armature.

The O.D. of calibration nut 346 comprises straight cylindrical end portions between which is a larger polygonally shaped portion (i.e. a hex). The lower end portion of the nut has an O.D. that provides some radial clearance to the central hole in wall 342. It is onto the lower end portion that wave spring washer 350 is assembled, prior to calibration nut 346 being threaded onto threaded stud 118 of the pintle. When calibration nut 346 is threaded onto threaded stud 118, wave spring washer 350 is axially compressed between the lower shoulder of the nut's hex and the upper surface of wall 342 surrounding the central hole therein. The nut is tightened to a condition where: 1) a shoulder on pintle 114 just below stud 118 engages shim 348 to force the flat upper end surface of shim 348 to bear against the flat lower surface of wall 342; the calibration nut lower end face bears against the shim; but wave spring washer 350 is not fully axially compressed. This type of joint axially secures the armature 116 to pintle 114, and in doing so allows armature 116 to position itself within sleeve 326 to better align to the guidance of the pintle that is established by bearing guide member 140. Hysteresis is minimized by minimizing any side loads transmitted from the pintle to the armature, or from the armature to the pintle, as the valve operates, and the disclosed means for attachment of the pintle to the armature is highly effective for this purpose.

Armature 116 is accurately axially positioned relative to air gap 322 by controlling the axial dimension of shim 348. Specifically, the armature position is controlled to lower stator member 174. The axial distance between the air gap and the valve seat is measured. The axial distance along the pintle between the location where valve head 117 seats on the valve seat and the location where the shoulder of the pintle bears against the shim is measured. Based on these two measurements, the axial dimension of the shim can be chosen such that the armature, when fastened to the pintle and disposed against the pintle shoulder, will be in a desired axial position to the air gap.

The position sensor that is housed within tower 80 of cap 66 comprises a plunger 414 that is self-biased against the flat upper end surface of nut 346. The sensor is accurately calibrated to the axial position of the armature-pintle assembly by setting the axial location of the flat upper end surface of-calibration nut 346. The axial dimension of the calibration nut is at least a certain minimum. The flat upper surface is ground, as required, to achieve a desired location that will cause plunger 414 to assume a desired calibration position when abutting the upper end of the calibration nut.

When EEGR valve 60 is in use, it is subjected to extremely harsh conditions. Thus, the cooling that is provided by ambient air space 76 is significant; however, the provision of this feature also means that foreign material such as muddy water can enter space 76. The construction of lower stator member 174 and bearing guide member 140 serve to allow muddy water that may enter space 76 and space 329 to drain out via one or more of the through-slots 78. FIG. 5 shows aligned holes 450 that can provide drainage too, even though they also serve the purpose of tooling locators during the process of making a valve.

Since flutes 168 provide for fluid communication between the two spaces 76 and 329, space 329 is essentially at ambient pressure. This is important in providing an atmospheric bleed for any vacuum that might pass through the clearance (albeit very small) between the pintle shaft and the bearing through-hole. Otherwise such vacuum might tend to suck minute particles of foreign matter into the clearance, to the possible eventual impairment of EEGR valve performance.

Certain of the inventive features relate to provision of concentricity of lower stator member 174 to bearing member 140 by the aforementioned press-fit, and to the shaping of the lower stator member 174 to resist muddy water intrusion. Because flutes 168 provide for communication between air space 76 and section 186 of the through-hole in lower stator member 174, muddy water that enters the air space via through-slots 78 can possibly intrude into section 186. Since a portion of pintle shaft 114 passes through section 186, it is possible that muddy water can reach the pintle shaft. However, by the same token, the flutes also provide a path for drainage. Additionally, the frusto-conical shaped section 182 of the lower stator member tends to deflect muddy water away.

While a presently preferred embodiment of the invention has been illustrated and described, it should be appreciated that principles are applicable to other embodiments falling within the scope of the following claims

What is claimed is:

1. An electric exhaust gas recirculation (EEGR) valve for an internal combustion engine comprising an enclosure including a base, an entrance at which engine exhaust gas to be recirculated enters said base, a passage that extends through said base for conveying engine exhaust gas that has entered said entrance, an exit at which engine exhaust gas that has passed through said passage exits said base, a valve mechanism disposed within said base for controlling flow through said passage, an electric actuator disposed within said enclosure for operating said valve mechanism, said enclosure comprising a side wall having openings to an interior air space providing for ambient air to flow through said air space, a bearing guide member comprising a central through-hole for guidance of a shaft extending from said electric actuator to said valve mechanism, stator structure providing a magnetic circuit path for said actuator and comprising a stator member disposed as an axial boundary of said air space, said stator member having a central through-hole, said bearing guide member extending into, and having a press-fit engagement with, at least a portion of the through-hole of said stator member, said bearing guide member comprising an exterior surface, said exterior surface comprising one portion which is concentric with said bearing guide member through-hole, and said exterior surface comprising another portion which is also concentric with said bearing guide member through-hole, said base comprising a wall surface, said one portion of said exterior surface of said bearing guide member extending into and having a press-fit engagement with said portion of the through-hole of said stator member, and said another portion of said exterior surface of said bearing guide member having a press-fit engagement with said wall surface of said base, said base including a hole at said entrance concentric with said wall surface of said base, said valve mechanism comprising a valve seat extending into, and having a press-fit engagement with, said hole in said base, said another portion of said exterior surface of said bearing guide member comprising at least one wedge-shaped formation that provides the press-fit engagement of said another portion of said exterior surface of said bearing guide member with said wall surface of said base.

2. An EEGR valve as set forth in claim 1 in which said bearing guide member comprises a radial flange having an outer perimeter, and said at least one wedge-shaped formation comprises a plurality of circumferentially spaced wedge-shaped projections on said outer perimeter of said flange.

3. An EEGR valve as set forth in claim 1 in which said valve seat comprises at least one wedge-shaped formation that provides the press-fit engagement of said valve seat with said hole in said base.

4. An EEGR valve as set forth in claim 3 in which said valve seat comprises an exterior surface and a through-hole having a seating surface concentric with said valve seat exterior surface, and said at least one wedge-shaped formation is disposed on said valve seat exterior surface.

5. An EEGR valve as set forth in claim 4 in which said base comprises a crimp at said hole in said base that crimps said valve seat in said hole.

6. An electric exhaust gas recirculation (EEGR) valve for an internal combustion engine comprising an enclosure including a base, an entrance at which engine exhaust gas to be recirculated enters said base, a passage that extends through said base for conveying engine exhaust gas that has entered said entrance, an exit at which engine exhaust gas that has passed through said passage exits said base, a valve mechanism disposed within said base for controlling flow through said passage, an electric actuator disposed within said enclosure for operating said valve mechanism, said enclosure comprising a side wall having openings to an interior air space providing for ambient air to flow through said air space, a bearing guide member comprising a central through-hole for guidance of a shaft extending from said electric actuator to said valve mechanism, stator structure providing a magnetic circuit path for said actuator and comprising a stator member disposed as an axial boundary of said air space, said stator member having a central through-hole, said bearing guide member extending into, and having a press-fit engagement with, at least a portion of the through-hole of said stator member, an internal space that is separated from said air space by said stator member, said bearing guide member having an axial end that is disposed in said internal space, said shaft extending from said axial end of said bearing guide member through said internal space, and means providing fluid communication between said air space and said internal space.

7. An EEGR valve as set forth in claim 6 in which said bearing guide member comprises an exterior surface a portion of which is concentric with said bearing guide member through-hole and has a press-fit engagement with said portion of the through-hole of said stator member, and said means providing fluid communication between said air space and said internal space comprises at least one flute in said exterior surface portion of said bearing guide member.

8. An EEGR valve as set forth in claim 7 in which said at least one flute in said exterior surface portion of said bearing guide member comprises a plurality of such flutes circumferentially separated from each other by ribs, and said ribs provide said exterior surface portion of said bearing guide member that has a press-fit engagement with said portion of the through-hole of said stator member.

9. An EEGR valve as set forth in claim 8 in which said axial end of said bearing guide member comprises a crown.

10. An electric exhaust gas recirculation (EEGR) valve for an internal combustion engine comprising an enclosure including a base, an entrance at which engine exhaust gas to be recirculated enters said base, a passage that extends through said base for conveying engine exhaust gas that has entered said entrance, an exit at which engine exhaust gas that has passed through said passage exits said base, a valve mechanism disposed within said base for controlling flow through said passage, an electric actuator disposed within said enclosure for operating said valve mechanism, said enclosure comprising a side wall having openings to an interior air space providing for ambient air to flow through said air space, a bearing guide member comprising a central through-hole for guidance of a shaft extending from said electric actuator to said valve mechanism, stator structure providing a magnetic circuit path for said actuator and comprising a stator member disposed as an axial boundary of said air space, said stator member having a central through-hole, said bearing guide member exiting into, and having a press-fit engagement with, at least a portion of the through-hole of said stator member, an internal space that is separated from said air space by said stator member, said bearing guide member has an axial end that is disposed in said internal space, and said shaft extends from said axial end of said bearing guide member through said internal space, said internal space is also bounded by a non-magnetic member that comprises a through-hole through which said shaft passes in a direction from said internal space toward said electric actuator.

11. An electric exhaust gas recirculation (EEGR) valve for an internal combustion engine comprising an enclosure including a base, an entrance at which engine exhaust gas to be recirculated enters said base, a passage that extends through said base for conveying engine exhaust gas that has entered said entrance, an exit at which engine exhaust gas that has passed through said passage exits said base, a valve mechanism disposed within said base for controlling flow through said passage, an electric actuator disposed within said enclosure for operating said valve mechanism, said enclosure comprising a side wall having openings to an interior air space providing for ambient air to flow through said air space, a bearing guide member comprising a central through-hole for guidance of a shaft extending from said electric actuator to said valve mechanism, stator structure providing a magnetic circuit path for said actuator and comprising a stator member disposed as an axial boundary of said air space, said stator member having a central through-hole, said bearing guide member extending into, and having a press-fit engagement with, at least a portion of the through-hole of said stator member, said portion of said stator member through-hole is a radially inner surface of a rim that is directed radially inwardly from an axial cylindrical wall of said stator member.

12. An electric exhaust gas recirculation valve (EEGR) for an internal combustion engine comprising an enclosure including a base, an entrance at which engine exhaust gas to be recirculated enters said base, a passage that extends through said base for conveying engine exhaust gas that has entered said entrance, an exit at which engine exhaust gas that has passed through said passage exits said base, a valve mechanism disposed within said base for controlling flow through said passage, an electric actuator disposed within said enclosure for operating said valve mechanism a bearing guide member comprising a central through-hole for guidance of a shaft extending from said electric actuator to said valve mechanism, stator structure providing a magnetic circuit path for said actuator and comprising a stator member, said stator member having a central through-hole, said bearing guide member extending into, and having a press-fit engagement with, at least a portion of the through-hole of said stator member, said bearing guide member comprising an exterior surface, said exterior surface comprising one portion which is concentric with said bearing guide member through-hole, and said exterior surface comprising another portion which is also concentric with said bearing guide member through-hole, said base comprising a wall surface, said one portion of said exterior surface of said bearing guide member having a press-fit engagement with said portion of the through-hole of said stator member, and said another portion of said exterior surface of said bearing guide member having a press-fit engagement with said wall surface of said base, said base including a hole at said entrance concentric with said wall surface of said base, said valve mechanism comprising a valve seat extending into and having a press-fit engagement with said hole in said base, said another portion of said exterior surface of said bearing guide member comprises at least one wedge-shaped formation that provides the press-fit engagement of said another portion of said exterior surface of said bearing guide member with said wall surface of said base.

13. An EEGR valve as set forth in claim 12 in which said bearing guide member comprises a radial flange having an outer perimeter, and said at least one wedge-shaped formation comprises a plurality of circumferentially spaced wedge-shaped projections on said outer perimeter of said flange.

14. An EEGR valve as set forth in claim 12 in which said valve seat comprises at least one wedge-shaped formation that provides press-fit engagement of said valve seat with said hole in said base.

15. An EEGR valve as set forth in claim 14 in which said valve seat comprises an exterior surface and a through-hole having a seating surface concentric with said valve seat exterior surface, and said at least one wedge-shaped formation is disposed on said valve seat exterior surface.

16. An EEGR valve as set forth in claim 15 in which said base comprises a crimp at said hole in said base that crimps said valve seat in said hole.

17. An electric exhaust gas recirculation (EEGR) valve for an internal combustion engine comprising an enclosure including a base, an entrance at which engine exhaust gas to be recirculated enters said base, a passage that extends through said base for conveying engine exhaust gas that has entered said entrance, an exit at which engine exhaust gas that has passed through said passage exits said base, a valve mechanism disposed within said base for controlling flow through said passage, an electric actuator disposed within said enclosure for operating said valve mechanism, a bearing guide member comprising a central through-hole for guidance of a shaft extending from said electric actuator to said valve mechanism, stator structure providing a magnetic circuit path for said actuator and comprising a stator member, said stator member having a central through-hole, said bearing guide member extending into, and having a press-fit engagement with, at least a portion of the through-hole of said stator member, said bearing guide member having an axial end that is disposed in an internal space of the valve, said shaft extending from said axial end of said bearing guide member through said internal space, said bearing guide member comprising an exterior surface a portion of which is concentric with said bearing guide member through-hole and having a press-fit engagement with said portion of the through-hole of said stator member, said exterior surface portion of said bearing guide member comprises a plurality of flutes circumferentially separated from each other by ribs, and said ribs provide said exterior surface portion of said bearing guide member that has a press-fit engagement with said portion of the through-hole of said stator member.

18. An EEGR valve as set forth in claim 17 in which said axial end of said bearing guide member comprises a crown.

19. An EEGR valve as set forth in claim 17 which said internal space is bounded by a non-magnetic member that comprises a through-hole through which said shaft passes in a direction from said internal space toward said electric actuator.

20. An electric exhaust gas recirculation (EEGR) valve for an internal combustion engine comprising an enclosure including a base, an entrance at which engine exhaust gas to be recirculated enters said base, a passage that extends through said base for conveying engine exhaust gas that has entered said entrance, an exit at which engine exhaust gas that has passed through said passage exits said base, a valve mechanism disposed within said base for controlling flow through said passage, an electric actuator disposed within said enclosure for operating said valve mechanism, a bearing guide member comprising a central through-hole for guidance of a shaft extending from said electric actuator to said valve mechanism, stator structure providing a magnetic circuit path for said actuator and comprising a stator member, said stator member having a central through-hole, said bearing guide member extending into, and having a press-fit engagement with, at least a portion of the through-hole of said stator member, said portion of said stator member through-hole is a radially inner surface of a rim that is directed radially inwardly from an axial cylindrical wall of said stator member.

21. An electric exhaust gas recirculation (EEGR) valve for an internal combustion engine comprising an enclosure including a base, an entrance at which engine exhaust gas to be recirculated enters said base, a passage that extends through said base for conveying engine exhaust gas that has entered said entrance, an exit at which engine exhaust gas that has passed through said passage exits said base, a valve mechanism disposed within said base for controlling flow through said passage, an electric actuator disposed within said enclosure for operating said valve mechanism, a bearing guide member comprising a central through-hole for guidance of a shaft extending from said electric actuator to said valve mechanism, stator structure providing a magnetic circuit path for said actuator and comprising an upper stator member and a lower stator member cooperatively defining an air gap in said magnetic circuit path, said electric actuator comprising a ferromagnetic armature disposed proximate said air gap to be acted upon by magnetic flux in said magnetic circuit path and correspondingly operate said valve mechanism by selectively axially positioning said shaft, said lower stator member comprises a central through-hole, said bearing guide member comprising an exterior surface, said exterior surface comprising one portion which is concentric with said bearing guide member through-hole and having a press-fit engagement with at least a portion of the through-hole of said lower stator member, said exterior surface comprising another portion which is also concentric with said bearing guide member through-hole, said enclosure comprising a bottom end wall to which said base is attached and a cylindrical side wall extending axially from said bottom end wall away from said base, said upper stator member comprising a radial flange having a radially outer perimeter that has a press-fit engagement with a portion of an interior surface of said enclosure side wall and is disposed axially against an internal shoulder of said enclosure side wall, said bottom end wall of said enclosure comprising a through-hole that is concentric with said interior surface portion of said enclosure side wall with which said upper stator member flange perimeter has a press-fit engagement, said another portion of said exterior surface of said bearing guide member having a press-fit engagement with said through-hole in said bottom end wall of said enclosure, said lower stator member comprising a radial flange having an outer perimeter, said enclosure side wall comprising another internal shoulder spaced axially from said first-mentioned shoulder, and said lower stator radial flange is disposed axially against said another internal shoulder with said outer perimeter of said lower stator radial flange having radial clearance to a portion of said enclosure side wall adjoining said shoulder.

22. An EEGR valve as set forth in claim 21 in which said bearing guide member has a further portion of its exterior surface that is concentric with its through-hole, said base comprises a wall surface, said further portion of said exterior surface of said bearing guide member having a press-fit engagement with said wall surface of said base.

23. An EEGR valve as set forth in claim 22 in which said further portion of said exterior surface of said bearing guide member having a press-fit engagement with said wall surface of said base comprises a radial flange having an outer perimeter that has a press-fit engagement with said wall surface of said base, and said another portion of said exterior surface of said bearing guide member that has a press-fit engagement with said through-hole in said bottom end wall of said enclosure comprises a circular ridge disposed axially contiguous said radial flange of said bearing guide member.

24. An electric exhaust gas recirculation (EEGR) valve for an internal combustion engine comprising an enclosure including a base, an entrance at which engine exhaust gas to be recirculated enters said base, a passage that extends through said base for conveying engine exhaust gas that has entered said entrance, an exit at which engine exhaust gas that has passed through said passage exits said base, a valve mechanism disposed within said base for controlling flow through said passage, an electric actuator disposed within said enclosure for operating said valve mechanism, said enclosure comprising a sidewall having openings to an interior air space providing for ambient air to flow through said air space, a bearing member extending axially within said air space and comprising a central through-hole for guidance of a shaft extending from said electric actuator to said valve mechanism, stator structure providing a magnetic circuit path for said actuator and comprising a stator member disposed as an axial boundary of said air space, said stator member having a central through-hole, wherein said bearing member is arranged concentric to said stator member through-hole, and wherein said bearing member extends into said stator member through-hole, said stator member comprises a cylindrical wall containing said stator member through-hole and said cylindrical wall comprises a frusto-conical surface extending toward said air space from where said bearing member extends into said stator member through-hole.

25. An electric exhaust gas recirculation (EEGR) valve for an internal combustion engine comprising an enclosure including a base, an entrance at which engine exhaust gas to be recirculated enters said base, a passage that extends through said base for conveying engine exhaust gas that has entered said entrance, an exit at which engine exhaust gas that has passed through said passage exits said base, a valve mechanism disposed within said base for controlling flow through said passage, an electric actuator disposed within said enclosure for operating said valve mechanism, said enclosure comprising a sidewall having openings to an interior air space providing for ambient air to flow bearing member extending axially within said air space and comprising a central through-hole for guidance of a shaft extending from said electric actuator to said valve mechanism, stator structure providing a magnetic circuit path for said actuator and comprising a stator member disposed as an axial boundary of said air space, said stator member having a central through-hole, wherein said bearing member is arranged concentric to said stator member through-hole, and wherein said frusto-conical surface is disposed axially approximately at the middle of said air space.

* * * * *